United States Patent
Kubota et al.

(10) Patent No.: US 11,581,603 B2
(45) Date of Patent: Feb. 14, 2023

(54) ELECTRIC POWER EQUIPMENT

(71) Applicant: HONDA MOTOR CO., LTD., Tokyo (JP)

(72) Inventors: Taichi Kubota, Wako (JP); Tatsuya Yamazaki, Wako (JP); Norikazu Shimizu, Wako (JP); Kunihiko Ishizuka, Wako (JP); Keisuke Muraoka, Wako (JP); Makoto Uchimi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 16/347,911

(22) PCT Filed: Nov. 17, 2017

(86) PCT No.: PCT/JP2017/041543
§ 371 (c)(1),
(2) Date: May 7, 2019

(87) PCT Pub. No.: WO2018/101091
PCT Pub. Date: Jun. 7, 2018

(65) Prior Publication Data
US 2019/0288255 A1    Sep. 19, 2019

(30) Foreign Application Priority Data

Nov. 30, 2016 (JP) .............................. JP2016-233543
Nov. 30, 2016 (JP) .............................. JP2016-322542

(51) Int. Cl.
*H01M 50/00*    (2021.01)
*H01M 50/20*    (2021.01)
(Continued)

(52) U.S. Cl.
CPC ............ *H01M 50/20* (2021.01); *A01D 34/71* (2013.01); *A01D 34/78* (2013.01); *A01D 69/02* (2013.01);
(Continued)

(58) Field of Classification Search
CPC ........... H01M 2/1083; H01M 2220/20; H01M 50/20; H01M 2/10; A01D 34/71; A01D 34/78; A01D 69/02
See application file for complete search history.

(56) References Cited

U.S. PATENT DOCUMENTS 1,922,082 A * 8/1933 Dunzweiler ......... H01M 50/112
  429/187
5,937,623 A    8/1999 Wolf
(Continued)

FOREIGN PATENT DOCUMENTS

EP    2556739    *  2/2013    ............. A01D 34/68
EP    2819207 A1    12/2014
(Continued)

OTHER PUBLICATIONS

JP H08-162082 JPO Abstract Jun. 1996 JP H08-162082.*
(Continued)

*Primary Examiner* — Cynthia H Kelly
*Assistant Examiner* — Monique M Wills
(74) *Attorney, Agent, or Firm* — Armstrong Teasdale LLP

(57) ABSTRACT

Provided is electric power equipment that allows a battery to be installed and removed with ease. The electric power equipment (1) includes a main body (2) defining a battery receiving recess (40) having an open upper end, and a battery (20) configured to be received in the battery receiving recess, wherein an upper part of a front end part of the battery is provided with a projection (108) projecting in a forward direction, and a rear end part of the battery is
(Continued)

provided with a grip, and wherein an upper edge of the front end part of the battery receiving recess is provided with a supporting surface (36) configured to support a lower surface of the projection at least when the battery is being removed from the battery receiving recess.

12 Claims, 20 Drawing Sheets

(51) Int. Cl.
  *A01D 34/78* (2006.01)
  *A01D 69/02* (2006.01)
  *A01D 34/71* (2006.01)
  *A01D 101/00* (2006.01)
(52) U.S. Cl.
  CPC ..... *A01D 2101/00* (2013.01); *H01M 2220/20* (2013.01)

(56) References Cited

U.S. PATENT DOCUMENTS

| | | | |
|---|---|---|---|
| 2006/0090439 A1 | 5/2006 | Anderson et al. | |
| 2010/0221594 A1* | 9/2010 | Ro kamp | B25F 5/02 429/100 |
| 2010/0275564 A1 | 11/2010 | Baetica et al. | |
| 2011/0088362 A1* | 4/2011 | Rosa | B60L 50/52 56/11.9 |
| 2014/0299089 A1* | 10/2014 | Koenen | F02N 11/14 123/179.28 |

FOREIGN PATENT DOCUMENTS

| | | | |
|---|---|---|---|
| EP | 2875712 A1 | | 5/2015 |
| JP | H0350902 U | | 5/1991 |
| JP | H0817538 A | | 1/1996 |
| JP | H08-162082 | * | 6/1996 |
| JP | H1069896 A | | 3/1998 |
| JP | 2002042758 A | | 2/2002 |
| JP | 2002158062 A | | 5/2002 |
| JP | 200361432 A | | 3/2003 |
| JP | 2009026775 A | | 2/2009 |
| JP | 2013063054 A | | 4/2013 |
| JP | 2014147353 A | | 8/2014 |
| JP | 2014239659 A | | 12/2014 |
| JP | 2015069823 A | | 4/2015 |

OTHER PUBLICATIONS

JP H08-162082 ESPACENET English machine translation Jun. 1996.*
International Search Report for International Application No. PCT/JP2017/041543, dated Feb. 6, 2018, 2 pages.
Notice of Reasons for Refusal for JP Application No. 2016-233543, dated Aug. 6, 2019, 2 pages.
Extended European Search Report for EP Application No. 17875114.5, dated Nov. 12, 2019, 6 pages.

* cited by examiner

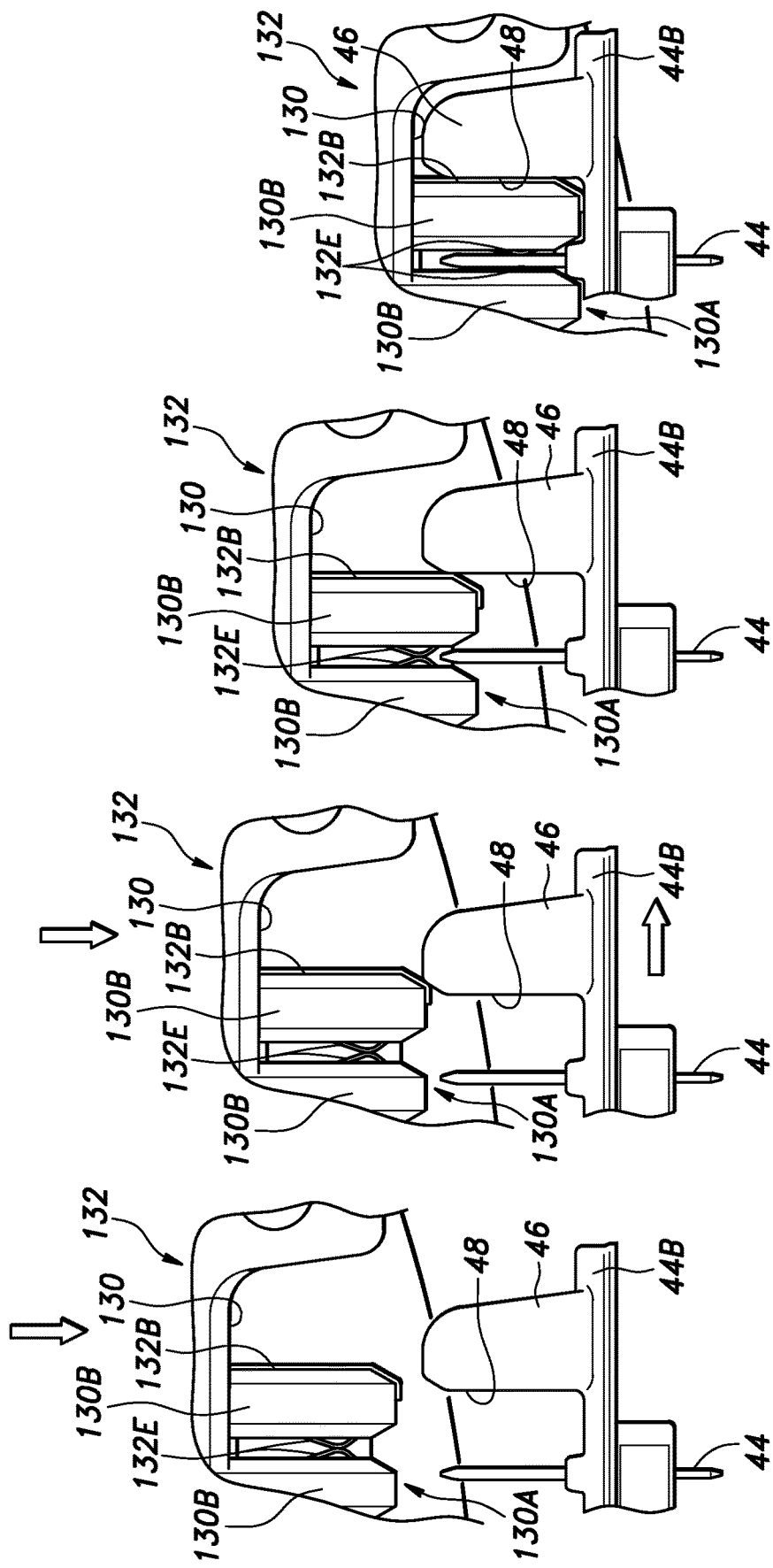

ELECTRIC POWER EQUIPMENT

CROSS-REFERENCE TO RELATED APPLICATIONS

This application is a U.S. National Phase Application of PCT/JP2017/041543, filed Nov. 17, 2017, which claims the benefit of priority to Japanese patent applications JP2016233542, filed Nov. 30, 2016, and JP2016233543, filed Nov. 30, 2016, the contents of which are hereby expressly incorporated by reference in their entirety.

TECHNICAL FIELD

The present invention relates to electric power equipment provided with a battery pack (which will be referred to as "battery" in the following disclosure).

BACKGROUND ART

Electric mowers which may be considered as one form of electric power equipment are often provided with a battery mounted on a mower main body via a bracket (see Patent Document 1, for instance). In the prior art arrangement disclosed in Patent Document 1, the battery is placed laterally on a bracket, and fixedly secured thereto by using an elastic belt.

A known electric mower includes a main body provided with a battery mounting part fitted with a pair of rails, and a rechargeable battery provided with a corresponding pair of rails so as to be detachably mounted to the battery mounting part. See Patent Document 2, for instance. When installing the battery, the rails of the battery are engaged with the rails of the battery mounting part, and the battery is slid so as to connect the terminals of the battery with the terminals provided on the side of the main body.

PRIOR ART DOCUMENT(S)

Patent Document(s)

Patent Document 1: JP2003-61432A
Patent Document 2: JP2014-147353A

SUMMARY OF THE INVENTION

Task to be Accomplished by the Invention

An electric mower is desired to be configured so that the user can install and remove the battery with ease in view of improving the work efficiency. In the case of the electric mower disclosed in Patent Document 1, the elastic belt is required to be secured and released when installing and removing the battery, respectively, and some effort is required for the user to support the weight of the battery so as not to damage the battery bracket. It is therefore desired to simplify the process of installing and removing the battery into and out of the electric mower.

In the case of the electric mower disclosed in Patent Document 2, owing to warping of the rails and other reasons, the terminals of the battery may not be properly positioned relative to the corresponding terminals of the main body when installing the battery into the battery mounting part. At such a time, the terminals may be caused to deform so as to accommodate the error in the relative positioning of the two sets of terminals. Such deformation of the terminals may impair the electric conduction between the two sets of terminals, and may even damage the terminals. To avoid such a problem, it is necessary to properly position the battery when installing the battery, and this may cause some difficulty in properly connecting the two sets of terminals to each other.

In view of such a problem of the prior art, a primary object of the present invention is to provide electric power equipment which allows the battery to be installed and removed with ease.

Means to Accomplish the Task

To achieve such an object, the present invention provides electric power equipment, comprising: electric power equipment (1), comprising: a main body (2) defining a battery receiving recess (40) having an open upper end; and a battery (20) configured to be received in the battery receiving recess; wherein an upper part of an end part of the battery on a first side is provided with a projection (108) projecting in a direction of the first side, and an end part of the battery on a second side is provided with a grip (104), and wherein an upper edge of an end part of the battery receiving recess on the first side is provided with a supporting surface configured to support a lower surface of the projection at least when the battery is being removed from the battery receiving recess.

Thereby, when raising a rear end part of the battery, the battery can be kept supported by the main body of the power equipment by causing the lower surface of the projection to abut the supporting surface provided on the upper edge of the end part of the battery receiving recess on the first side.

In this arrangement, preferably, the lower surface of the projection is provided with a downward inclination toward the second side in side view, and the supporting surface is provided with a convex outer profile in side view.

Thereby, the lower surface of the projection, and the supporting surface for supporting the lower surface of the projection can be formed without any difficulty.

In this arrangement, preferably, the lower surface of the projection is provided with a concave curved profile in side view.

Since the lower surface of the projection is provided with a concave curved profile, when raising the rear end part of the battery, the user can lift the battery with a rotational movement by allowing the lower surface of the projection to slide over the supporting surface. As a result, the user is enabled to lift the battery with ease.

In this arrangement, preferably, the supporting surface is provided with a convex curved outer profile in side view.

Since the supporting surface is provided with a convex curved outer profile in side view, when raising the rear end part of the battery, the user can lift the battery with a rotational movement by allowing the lower surface of the cover protrusion to slide over the supporting surface. As a result, the user is enabled to lift the battery with ease.

In this arrangement, preferably, the lower surface of the projection and the supporting surface are provided with mutually complementary profiles.

Owing to this arrangement, the area of contact between the lower surface of the projection and the supporting surface when lifting the battery is maximized so that the user is enabled to lift the battery in a stable manner In this arrangement, preferably, the electric power equipment further comprises: a spring member (80, 82) provided in an end part of a bottom part of the battery receiving recess on the second side and configured to urge the battery received in the battery receiving recess upward; and a latch member (66) provided in an end wall part of the battery receiving recess on the second side and configured to engage an end part of the battery on the second side.

Thereby, the battery is pushed upward by the spring member provided in the end part of the bottom part of the battery receiving recess on the second side when the engagement between the latch member and the end part of the battery on the second side is released so that the removal of the battery from the battery receiving recess can be facilitated. Further, since the spring member absorbs the vibrations of the main body, the battery can be protected from vibrations.

In this arrangement, preferably, the electric power equipment further comprise: an engagement portion (50) provided in a wall continuously extending downward from the upper edge of the end part of the battery receiving recess on the first side; and a corresponding engagement portion (136) provided in a lower part of the battery on the first side and configured to be engaged by the engagement portion so as to restrict an upward movement of the battery.

Thereby, battery is retained in the battery receiving recess when the battery is received in the battery receiving recess so that the battery is prevented from projecting upward from the battery receiving recess.

In this arrangement, preferably, the electric power equipment further comprises a spring member (82) provided in a bottom part of the end part of the battery receiving recess on the first side and configured to urge the battery received in the battery receiving recess upward.

Thereby, the rattling of the battery when the battery is received in the battery receiving recess can be avoided. The spring member provided in the end part of a bottom part of the battery receiving recess on the first side can also absorb the impact on the battery when the battery is dropped onto the bottom surface of the battery receiving recess.

In this arrangement, preferably, a bottom surface of the battery receiving recess is provided with a downward inclination toward the first side.

Thereby, the battery can be slid into the battery receiving recess along the bottom surface of the battery receiving recess under the gravitational force so that the installing of the battery can be facilitated.

In this arrangement, preferably, the electric power equipment further comprises: an electric power feeding terminal (132) provided on a side of the battery; and an electric power receiving terminal (44) provided on a side of the battery receiving recess; wherein the electric power feeding terminal is provided on a side face of the end part of the battery on the first side, and the electric power receiving terminal is provided adjacent to the upper edge of the battery receiving recess.

When removing the battery, the battery undergoes a rotational movement owing to the contact between the supporting surface and the lower surface of the protrusion. According to this arrangement, the electric power feeding terminal and the electric power receiving terminal can be favorably protected as opposed to the case where the electric power feeding terminal is provided on a side face of the battery other than the first side (front side) because the electric power feeding terminal moves away from the electric power receiving terminal only gradually.

In this arrangement, preferably, the battery is configured to be inserted into the battery receiving recess in a prescribed insertion direction, and a front end of the battery with respect to the insertion direction is provided with an electric power feeding terminal plate (132A), the electric power feeding terminal including a plurality of electric power feeding terminals projecting from the electric power feeding terminal plate and arranged along a lateral direction which is orthogonal to the insertion direction and horizontal, wherein the electric power feeding terminal plate is provided with a pair of electric power feeding terminal guide pieces (132B) projecting further than the electric power feeding terminals from parts of the electric power feeding terminal plate located on laterally outer sides of the respectively laterally outermost electric power feeding terminals, wherein an electric power receiving terminal plate (44B) is supported by a front end part of the battery receiving recess with respect to the battery insertion direction so as to be moveable in the lateral direction, and the electric power receiving terminal includes a plurality of electric power receiving terminals projecting from the electric power receiving terminal plate so as to correspond to the respective electric power feeding terminals, and wherein the electric power receiving terminal plate is provided with a pair of electric power receiving terminal guide pieces (46) projecting from parts of the electric power receiving terminal plate located on laterally outer sides of the respective laterally outermost electric power receiving terminals, one of the electric power receiving guide piece pair and the electric power feeding guide piece pair being provided with a pair of guide surfaces laterally facing outwardly and configured to come closer to each other toward projecting ends thereof while another of the electric power receiving guide piece pair and the electric power feeding guide piece pair are provided with a pair of corresponding guide surfaces laterally facing inward and progressively spaced apart from each other toward projecting ends thereof.

The battery may be inserted into the battery receiving recess without the electric power feeding terminals and the electric power receiving terminals being properly aligned with one another. According to this arrangement, the electric power receiving terminals are displaced so as to be aligned with the electric power feeding terminals as the laterally inwardly facing surfaces of the electric power receiving terminal guide pieces slide over the laterally outwardly facing surfaces of the electric power feeding terminal guide pieces when the battery is being inserted so that the misalignment is corrected, and the connection between the electric power feeding terminals and the electric power receiving terminals is facilitated.

Also, since the electric power feeding terminal guide pieces project further than the electric power feeding terminals, the electric power feeding terminals are favorably protected from frontal impacts.

In this arrangement, preferably, the electric power equipment further comprises a plurality of terminal protection pieces (130B) provided between the adjoining electric power feeding terminals and on an outer side of each laterally outermost electric power feeding terminal, each terminal protection piece being formed as a plate member having a vertically extending major plane and projecting forward from the battery in the insertion direction, wherein each electric power receiving terminal is formed as a plate member having a vertically extending major plane, and each electric power feeding terminal includes a pair of sheet spring pieces (132E) configured to contact two sides of the corresponding electric power receiving terminal.

Thereby, when the battery is received in the battery receiving recess, each electric power receiving terminal is interposed between the corresponding sheet spring pieces on the side of the electric power feeding terminals. Since the sheet spring pieces and the terminal protection pieces both have a vertically extending major plane, the electric power receiving terminals can be moved in the vertical and fore and aft directions relative to the electric power feeding terminals. As a result, it becomes possible to place the battery into the battery receiving recess in such a manner as to involve a rotational movement.

The electric power equipment is expected to be used outdoors most of the time so that rainwater and other forms of moisture may come into the gaps between the electric power feeding terminals of the battery. According to this arrangement, the moisture can be drained downward through the gaps between the electric power feeding terminals and the terminal protection pieces so that the terminals are prevented from being damaged by the moisture.

In this arrangement, preferably, a side part of at least one of the terminal protection pieces is provided with a recess extending in the insertion direction, and a part of the corresponding electric power feeding terminal is configured to be received in the recess.

Thereby, a part of each electric power feeding terminal is received in the recess provided on the side part of the terminal protection piece so that the electric power feeding terminal is favorably protected from being damaged by external forces.

In this arrangement, preferably, a laterally outward facing side part of each of the terminal protection pieces provided on either lateral end is provided with a recess extending in a direction of projection of the terminal protection piece to receive the corresponding electric power feeding terminal guide piece.

Thereby, the electric power feeding terminal guide pieces are reinforced by the terminal protection pieces provided on the respective lateral end parts.

Effect of the Invention

The present invention provides electric power equipment that allows the battery to be installed and removed with ease.

BRIEF DESCRIPTION OF THE DRAWINGS

FIGS. 20A to FIG. 20D are views illustrating the transition of the states of the electric power receiving terminals until the electric power receiving terminals are connected to the electric power feeding terminals.

MODE(S) TO CARRY OUT THE INVENTION

An electric mower embodying the present invention is described in the following with reference to FIGS. 1 to 20.

Electric Mower

Figure 1:
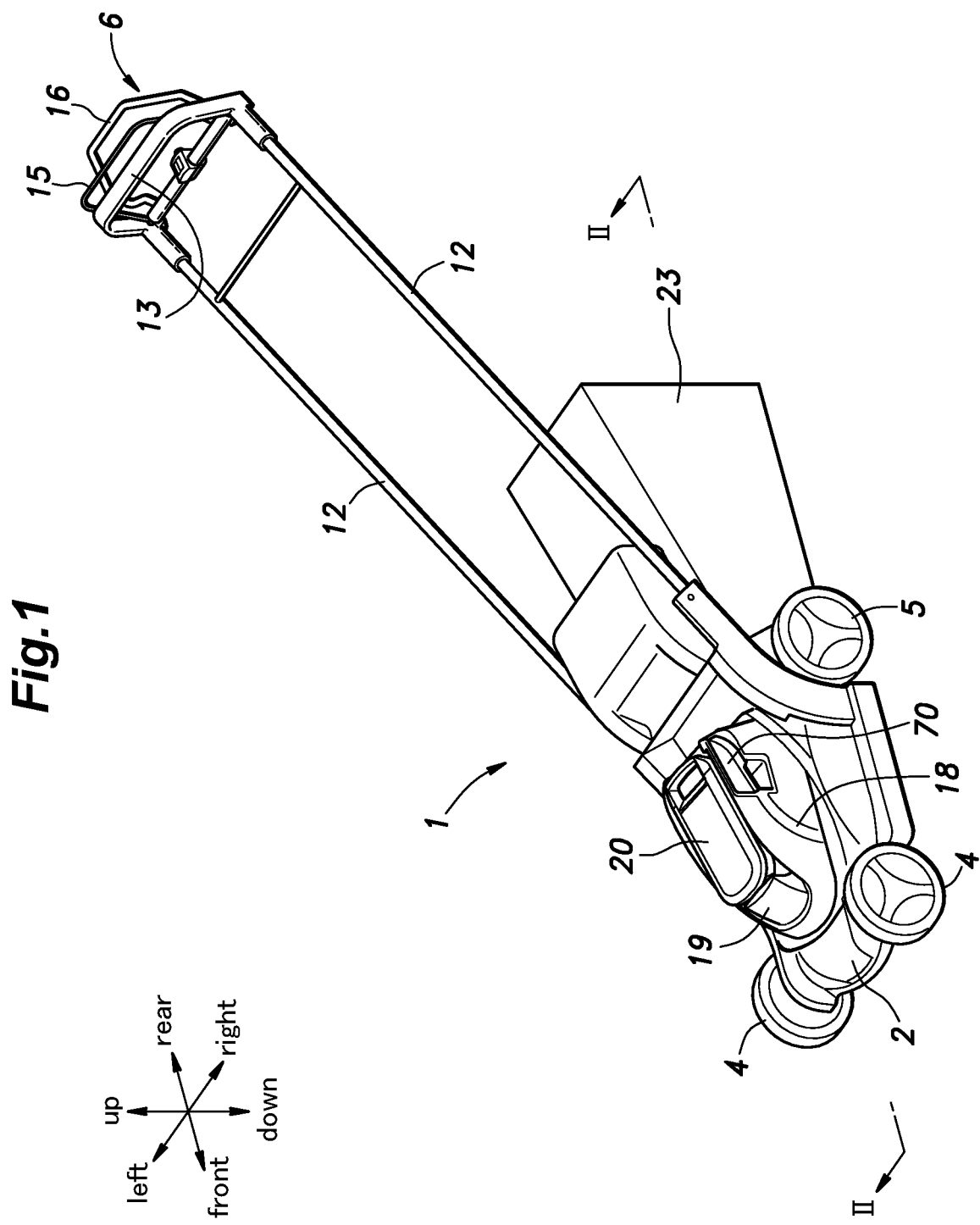
FIG. 1 is a perspective view of an electric mower according to the present invention.
Figure 2:
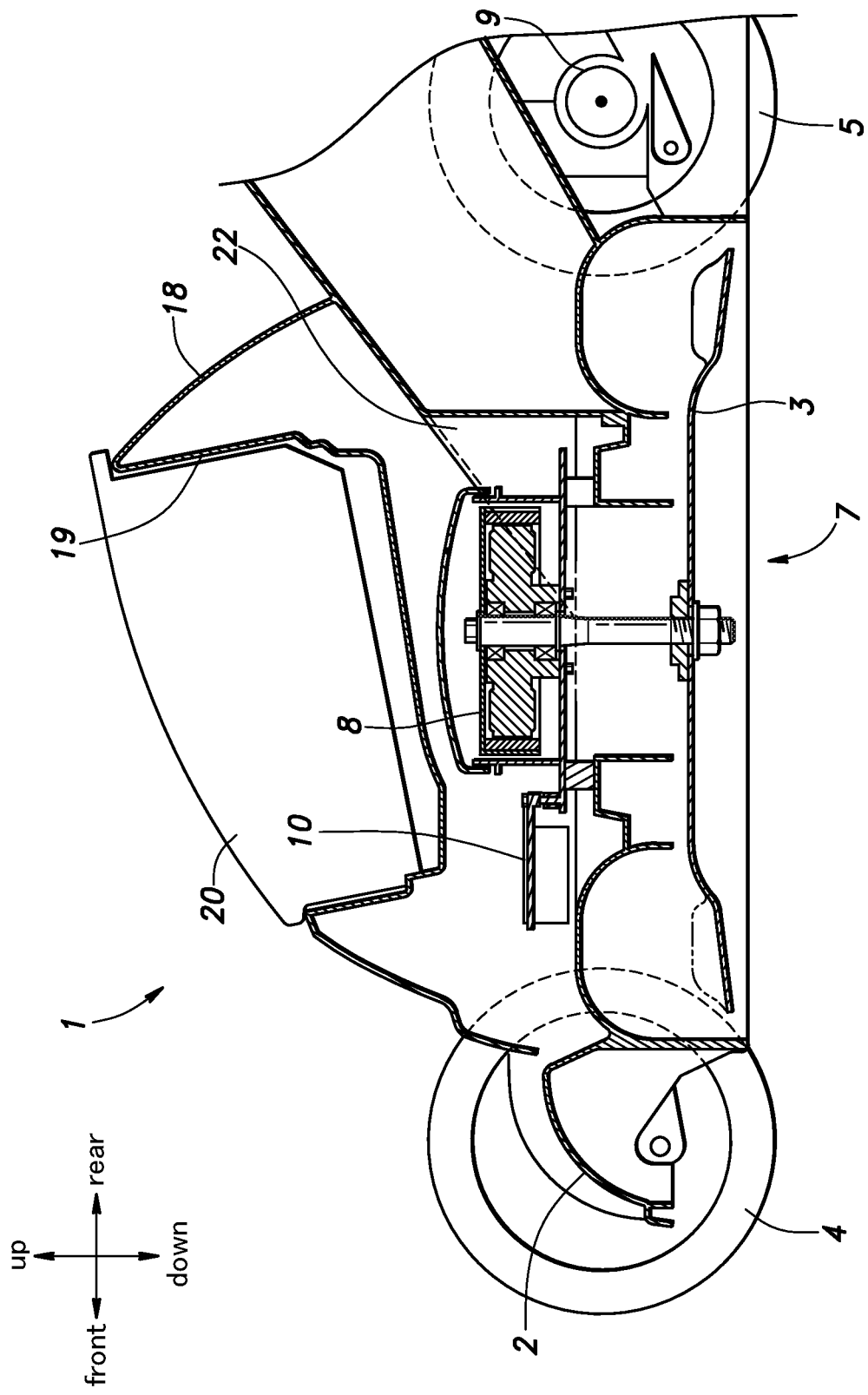
FIG. 2 is a sectional view taken along line II-II of FIG. 1.

As shown in FIGS. 1 and 2, the electric mower 1 according to the present embodiment includes a main body 2, a blade 3 placed in a lower part of the main body 2, a pair of front wheels 4 supported by the main body 2, a pair of rear wheels 5 supported by the main body 2, and a handle 6 extending rearward and upward from the main body 2. The main body 2 defines a cavity 7 in a lower central part thereof, and the blade 3 is received in the cavity 7. A blade motor 8 having the blade 3 coupled to an output shaft thereof and a travel motor 9 for driving the rear wheels 5 are supported by the main body 2. Both the blade motor 8 and the travel motor 9 consist of electric motors, and the main body 2 is provided with a control unit 10 for controlling these motors.

The handle 6 is provided with a pair side rods 12 extending rearward and upward from either side end of a rear part of the main body 2, and a cross rod 13 extending between the rear ends of the side rods 12. The cross rod 13 of the handle 6 is provided with a travel lever 15 for operating the travel motor 9 and a blade lever 16 for operating the blade motor 8.

An upper part of the main body 2 is provided with an upper cover 18 that covers the blade motor 8, the travel motor 9, and the control unit 10. A battery tray 19 formed in the upper cover 18 is configured to removably receive a battery 20 for supplying electric power to the motors 8 and 9 and the control unit 10.

A chute 22 extends rearward from the cavity 7 to a rear end part of the main body 2, and a grass bag 23 is attached to the rear end part of the main body 2 so as to close a rear opening of the chute 22. The grass cut by the blade 3 is discharged rearward from the cavity 7 through the chute 22 and collected in the grass bag 23.

Battery Tray

Figure 3:
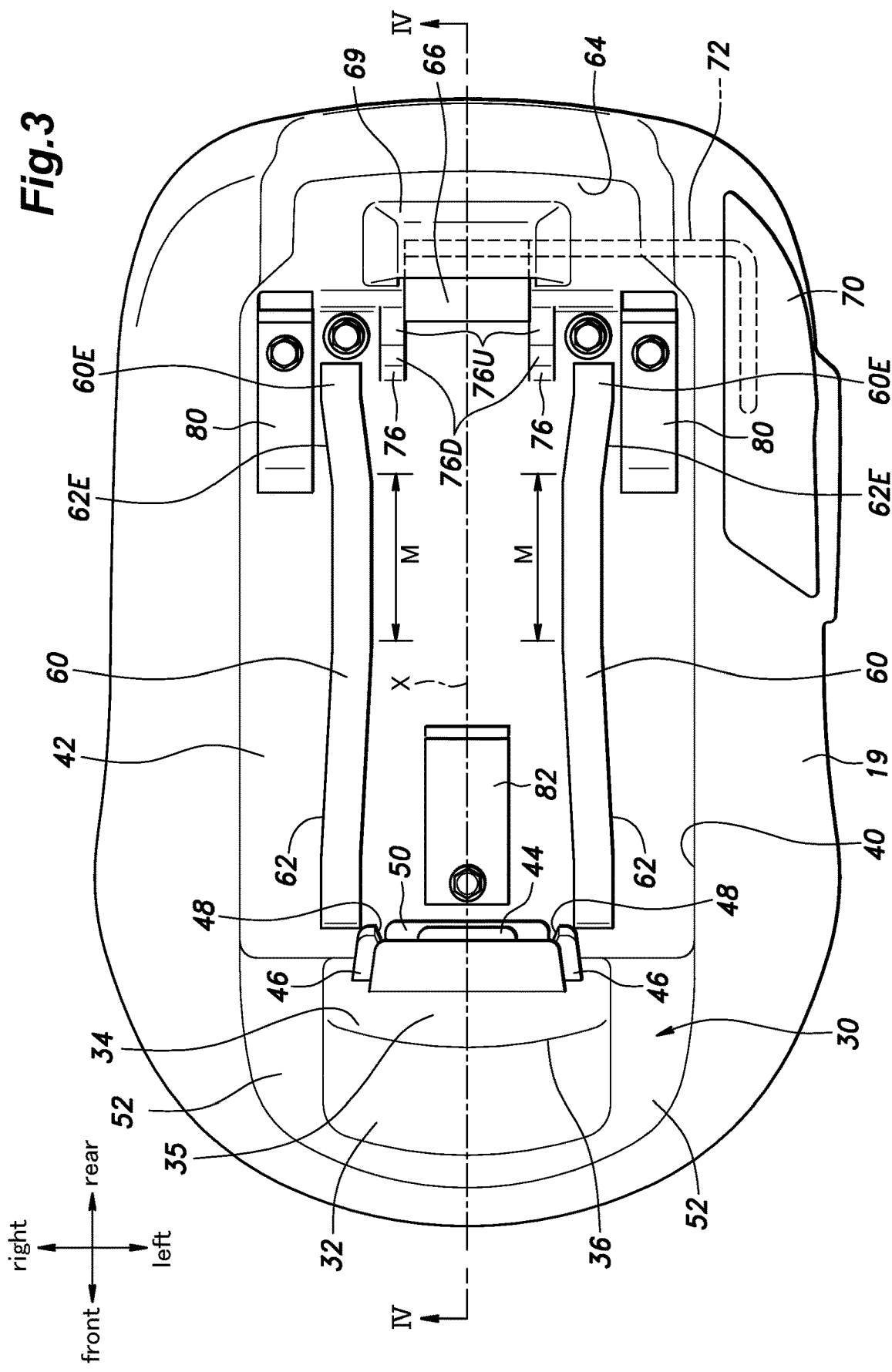
FIG. 3 is a plan view of a battery tray of the electric mower.
Figure 4:
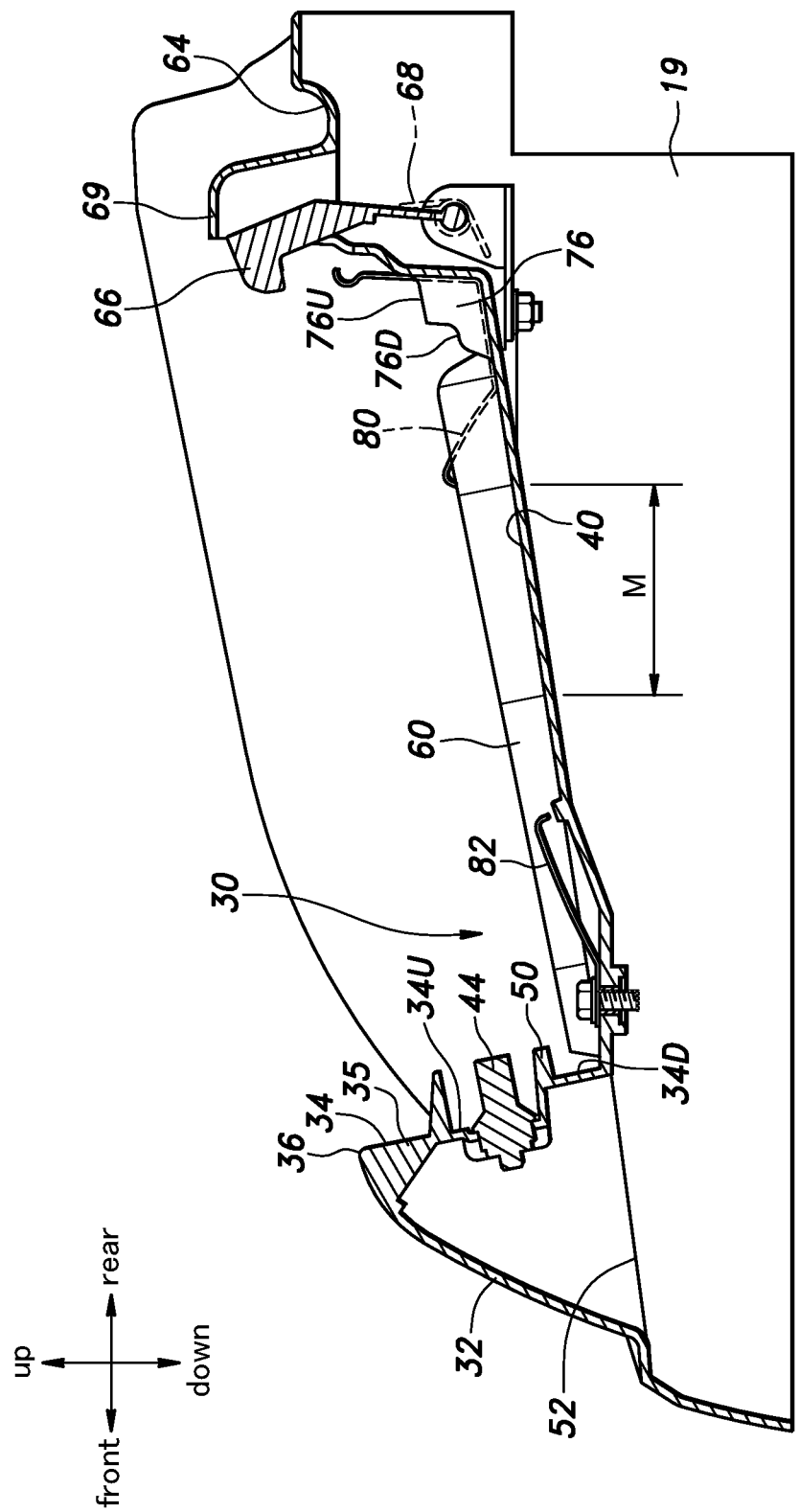
FIG. 4 is a sectional view taken along line IV-IV of FIG. 3.

As shown in FIGS. 3 and 4, the battery tray 19 defines a tray recess 30 having an open side facing upward and forward. The tray recess 30 has a substantially rectangular periphery somewhat elongated in the fore and aft direction, and is symmetrical with respect to a symmetry plane X extending in the fore and aft direction.

A front edge of the tray recess 30 is provided with an electric power receiving part 32 that is symmetric with respect to the symmetry plane X, and bulges substantially upward from the bottom wall of the tray recess 30. The electric power receiving part 32 includes a front wall facing in an upper forward direction, an electric power receiving part supporting surface 34 positioned behind the front wall and facing substantially rearward, and a pair side walls. A part of the electric power receiving part 32 located between the front wall and the electric power receiving part supporting surface 34 is formed as a supporting surface 36 defining an upwardly facing convex curved profile and having a substantially constant curvature in side view.

The battery 20 is received in a battery receiving recess 40 defined by the side wall surfaces, the rear wall surface and the bottom surface of the tray recess 30, and the electric power receiving part supporting surface 34. Therefore, a rearward facing electric power receiving part support wall 35 of the electric power receiving part 32 corresponds to the front wall defining the front edge of the battery receiving recess 40. The battery 20 is placed on a placing surface 42 which is delimited by the side surfaces of the tray recess 30, the rear surface of the tray recess 30, and a hypothetical plane extending laterally and vertically from the electric power receiving part supporting surface 34. As shown in FIG. 3, the battery receiving recess 40 and the placing surface 42 are also symmetric with respect to the symmetry plane X.

The electric power receiving part support wall 35 is provided with electric power receiving terminals 44 that project rearward from a laterally central part thereof. The electric power receiving terminals 44 consist of male terminals that receive electric power from the battery 20, and supply electric power to the motors 8 and 9, and the control unit 10.

Figure 5:
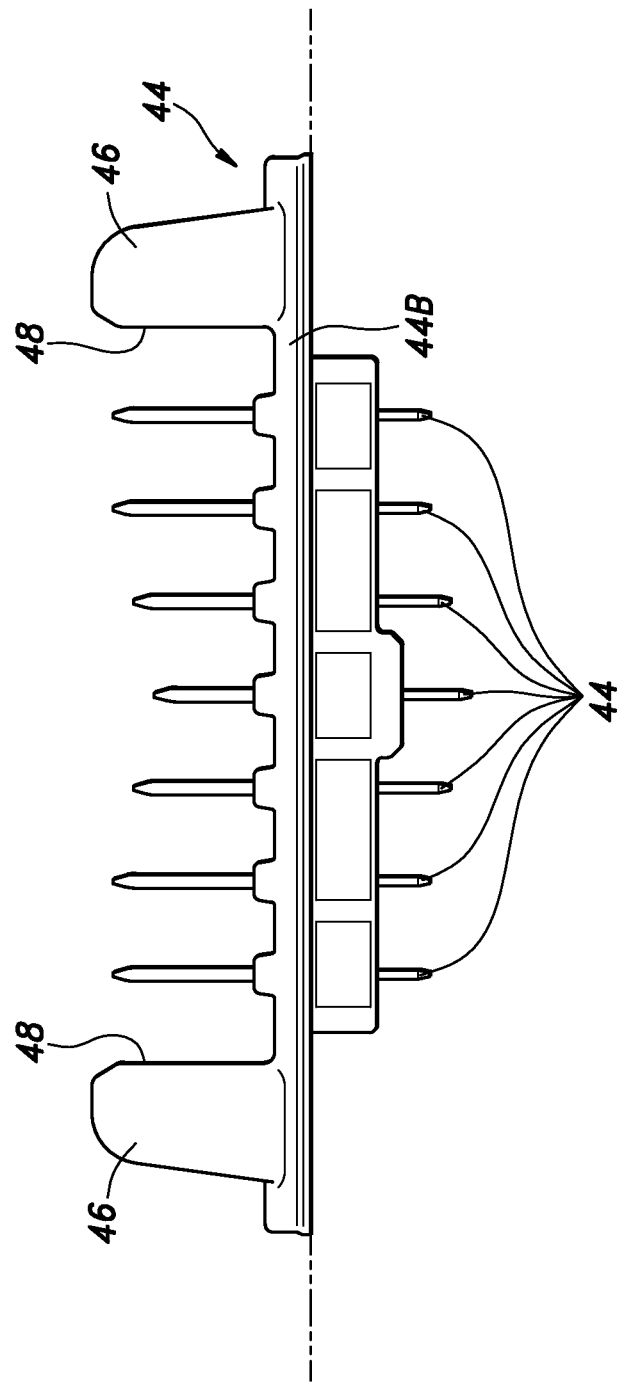
FIG. 5 is a plan view of electric power feeding terminals.

As shown in FIG. 5, the electric power receiving part 32 supports an electric power receiving terminal plate 44B consisting of an insulating plate member having a front face and a rear face in a floating manner so as to be moveable at least in the lateral direction relative to the electric power receiving part 32. The electric power receiving terminals 44 are arranged on the electric power receiving terminal plate 44B at a regular interval along the lateral direction. Each electric power receiving terminal 44 is formed as a plate member having a major plane extending vertically and extending through the electric power receiving terminal plate 44B. The rear end of the electric power receiving terminal plate 44B is tapered in the rearward direction. In the illustrated embodiment, seven power receiving terminals 44 are passed through the electric power receiving terminal plate 44B.

A pair of electric power receiving terminal guide pieces 46 project rearward from the parts of the electric power receiving terminal plate 44B located on laterally outer sides of the respective laterally outermost electric power receiving terminals 44. The electric power receiving terminal guide pieces 46 are formed in a mutually symmetric manner, and are provided inwardly facing electric power receiving terminal guide surfaces 48. The electric power receiving terminal guide surfaces 48 are configured to be progressively spaced apart from each other toward the rear ends thereof.

As shown in FIG. 4, in the illustrated embodiment, the electric power receiving part support wall 35 protrudes rearward in a part thereof located under the electric power receiving terminals 44 so that the rear wall of the electric power receiving part 32 is formed in a stepwise fashion with respect to the vertical direction in sectional view taken along the symmetry plane X so that the electric power receiving part supporting surface 34 includes two rearwardly facing surface parts (34U and 34D). The electric power receiving terminals 44 are arranged along the lower edge of the upper surface part 34U of the electric power receiving part supporting surface 34. The upper end of the lower surface part 34D is provided with a front engagement portion 50 projecting rearward.

As shown in FIG. 3, in the illustrated embodiment, a gap is defined between each side surface of the tray recess 30 and the opposing side surface of the electric power receiving part 32 so that a communication slot 52 is defined between the left side surface of the tray recess 30 and the left side surface of the electric power receiving part 32, and another communication slot 52 is defined between the right side surface of the tray recess 30 and the right side surface of the electric power receiving part 32.

As shown in FIG. 4, the placing surface 42 extends in the lateral and fore and aft directions so as to have a rectangular shape, and is provided with a downward inclination toward the front. The bottom surfaces of the communication slots 52 also have a downward inclination from the front end of the placing surface 42 toward the front, and is connected to the front face of the battery tray 19.

As shown in FIG. 3, the placing surface 42 is provided with a pair of guide rails 60 extending in the fore and aft direction from a vicinity of the front end of the placing surface 42 to a vicinity of the rear end of the placing surface 42. The left and right guide rails 60 are mirror images of each other about the symmetry plane X in plan view, and an outer side surface (facing outward) of each guide rail 60 serves as a guide surface 62. The two guide rails 60 are parallel to each other in an intermediate region M of the placing surface 42 with respect to the fore and aft direction. The parts of the guide rails 60 in a front end region of the placing surface 42 progressively spread apart from each other toward the front ends thereof, and the parts of the guide rails 60 in a rear end region of the placing surface 42 also progressively spread apart from each other toward the rear ends thereof. More importantly, the guide surfaces 62 of the two guide rails 60 are parallel to each other in the intermediate region M, progressively spread apart from each other toward the front in the front end region, and progressively spread apart from each other toward the rear in the rear end region. Thus, the guide rails 60 are provided with guide member auxiliary portions 60E to the rear of the intermediate region M that progressively spread apart from each other toward the rear, and the guide member auxiliary portions 60E are provided with guide member auxiliary surfaces 62E facing away from each other. Therefore, the guide surfaces 62 include guide member auxiliary surfaces 62E that are located behind the intermediate region M, and progressively spread apart from each other toward the rear.

As shown in FIG. 4, the upper surfaces of the guide rails 60 both have a downward slope toward the front ends thereof. In other words, the height of the upper surfaces of the guide rails 60 as measured from the placing surface 42 gets greater toward the rear.

As shown in FIG. 3, a rear end part of the battery tray 19 is provided with a rear recess 64 opening upward. As shown in FIG. 1, when the battery 20 is received in the battery receiving recess 40, the rear recess 64 receives the rear end of the battery 20. As shown in FIG. 4, a laterally central part of the rear recess 64 is provided with a vertically extending hole, and a latch member 66 extends through this hole. The upper end of the latch member 66 is provided with a locking claw projecting forward, and the lower end of the latch member 66 is pivotally supported by a support member fastened to the battery tray 19 by screws so as to be rotatable around a laterally extending rotational center line. The lower end of the latch member 66 is provided with a torsion coil spring 68 that urges the locking claw provided in the upper end of the latch member 66 forward. The rear recess 64 is provided with a latch member cover 69 that covers the locking claw provided in the upper end of the latch member 66 from above.

As shown in FIGS. 1 and 3, a battery removal switch 70 is provided on an upper surface of the battery tray 19. The battery removal switch 70 is connected to the latch member 66 via a plurality of members that form a link mechanism that converts the pressure applied to the battery removal switch 70 into the rearward movement of the locking claw provided in the upper end of the latch member 66. When the pressure applied to the battery removal switch 70 is removed, the locking claw provided in the upper end of the latch member 66 is caused to move forward under the biasing force of the torsion coil spring 68.

As shown in FIG. 3, a rear end of the placing surface 42 (the bottom surface of the battery receiving recess 40) is provided with a pair of battery supporting protrusions 76 arranged in symmetry about the symmetry plane X. The battery supporting protrusions 76 extend forward inside the two guide rails 60 from the rear end of the placing surface 42 to a part adjacent to the rear ends of the guide rails 60. As shown in FIG. 4, each battery supporting protrusion 76 is formed in a stepwise manner so as to include an upper step 76U and a lower step 76D. The height of the upper step 76U as measured from the placing surface 42 is substantially equal to that of the guide rails 60, and the height of the lower step 76D as measured from the placing surface 42 is substantially equal to half the height of the guide rails 60.

A pair of first biasing members 80 (sheet springs) are provided on either outer side of rear end parts of the guide rails 60. The first biasing members 80 are each attached to the placing surface 42 by a screw, and provided with a front end extending along the placing surface 42 obliquely upward toward the front. Therefore, when the front end receives a downward force from the battery 20, the first biasing members 80 urge the battery 20 upward. The rear end of each first biasing member 80 extends rearward along the placing surface 42, and is bent upward to a vertically middle point of the rear surface of the battery receiving recess 40 with a rearward slant (progressively spaced apart from the rear surface in the rearward direction) toward the upper edge thereof. Therefore, when the rear ends of the first biasing members 80 receive a rearward force from the battery 20, the first biasing members 80 urge the battery 20 forward. Each first biasing member 80 is provided with the shape of letter L in side view so that the front end of the first biasing member 80 serves an a biasing device (spring member) that urges the battery 20 upward, and the rear end of the first biasing member 80 serves an a biasing device (spring member) that urges the battery 20 forward. In the following disclosure, the upwardly urging part of each first biasing member 80 will be referred to as free end, and the forwardly urging part of each first biasing member 80 will be referred to as base end.

A second biasing member 82 (sheet spring) is provided centrally between the guide rails 60 in a front end part of the placing surface 42. The second biasing member 82 is attached to the bottom wall of the battery receiving recess 40 by a screw, and extends rearward so as to get progressively spaced apart from the placing surface 42 toward the rear. When the rear end part of the second biasing member 82 receives a downward force from the battery 20, the battery 20 is urged upward by the second biasing member 82. In other words, the second biasing member 82 serves as a biasing device (spring member) that urges upward. The rear end part of the second biasing member 82 is bent downward.

Battery

Figure 6:
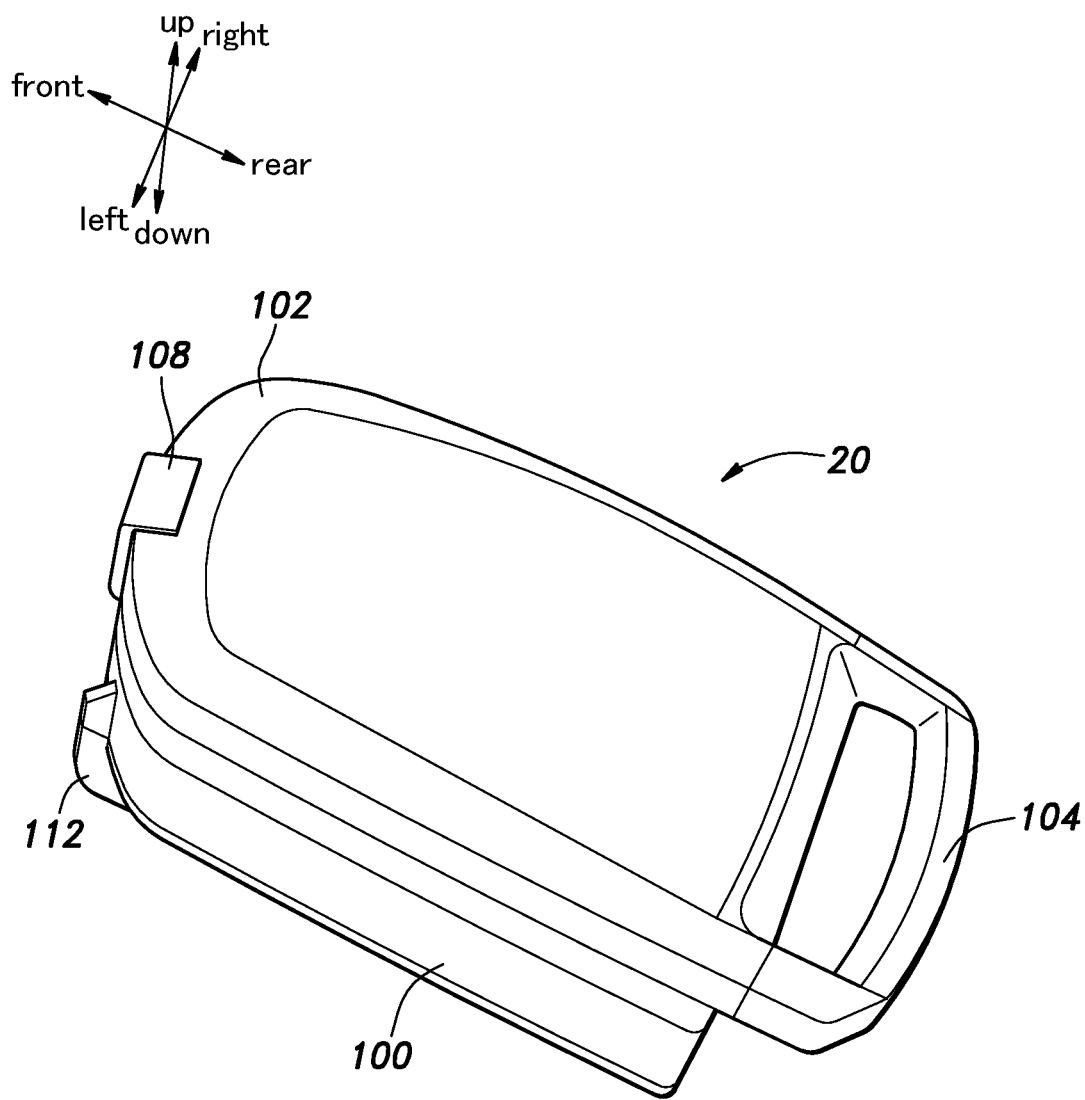
FIG. 6 is a perspective view of a battery of the electric mower.
Figure 7:
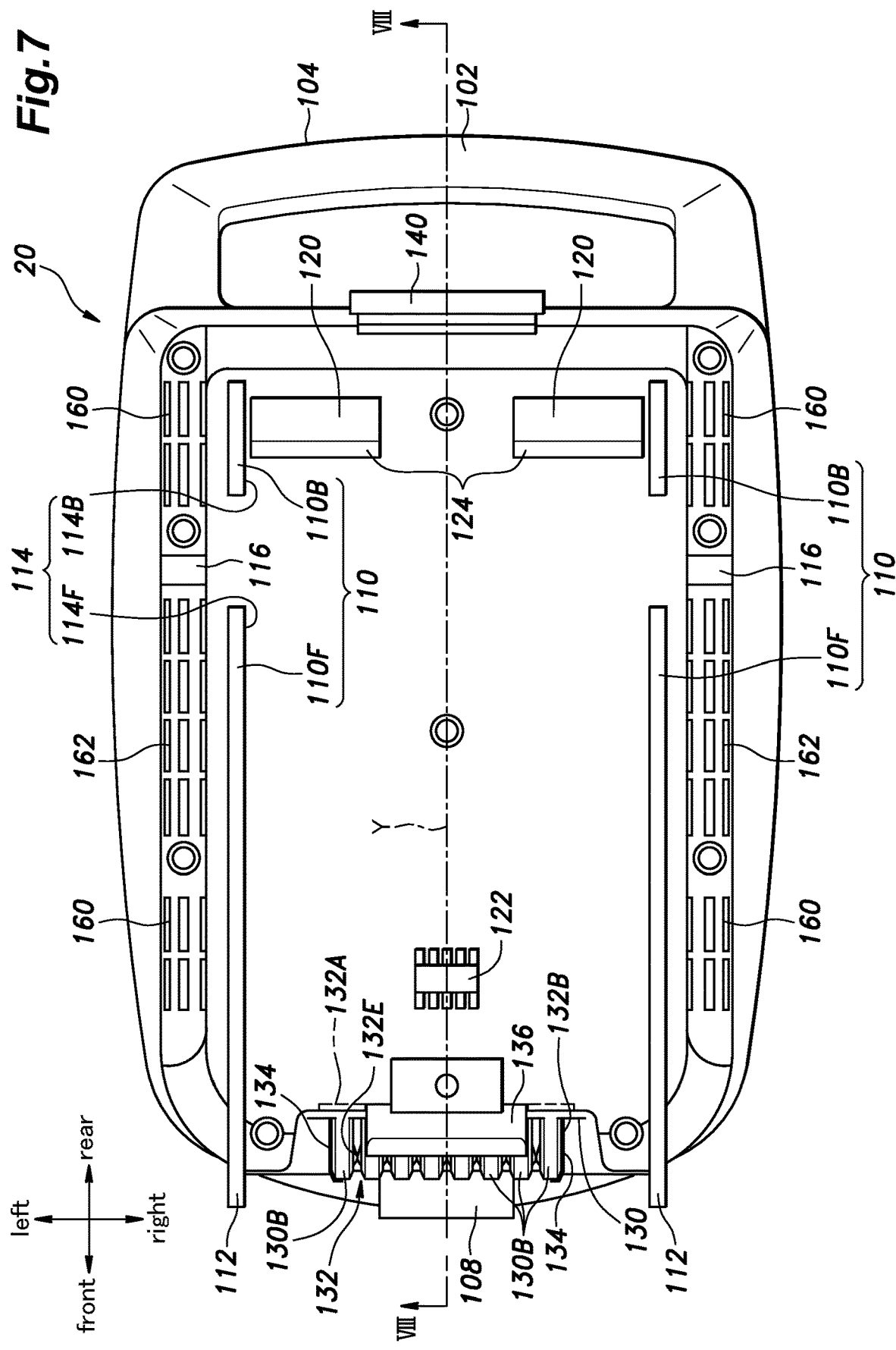
FIG. 7 is a bottom view of the battery.

As shown in FIG. 1, the battery 20 is elongated in the fore and aft direction as received in the battery receiving recess 40. The orientation mentioned in the following disclosure will be based on the state where the battery 20 is received in the battery receiving recess 40. As shown in FIGS. 1, 6 and 7, the battery 20 is symmetric about the longitudinal center line, and the symmetry plane thereof will be referred to as symmetry plane Y in the following disclosure.

Figure 8:
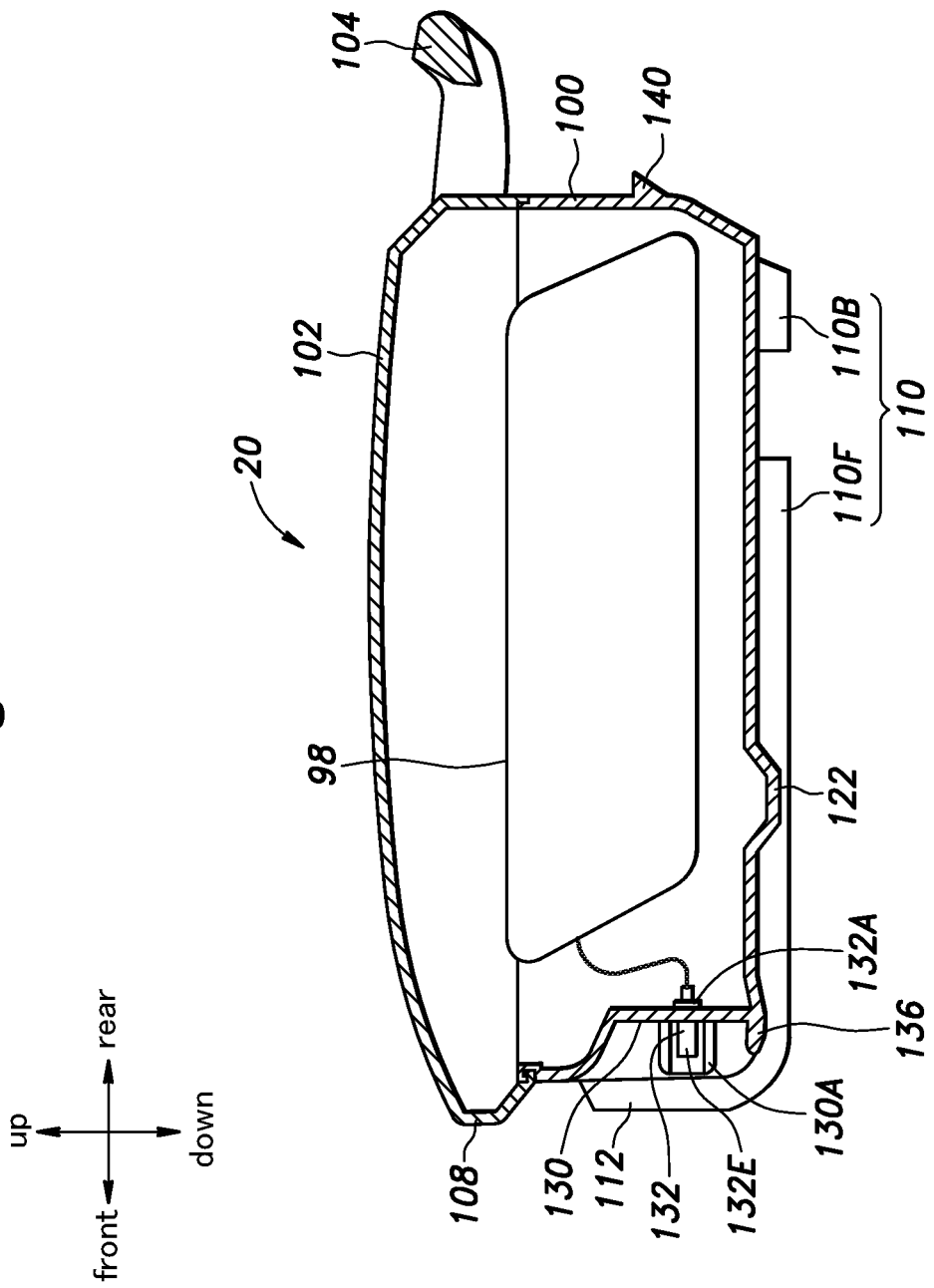
FIG. 8 is a sectional view taken along line VIII-VIII of FIG. 7.

The battery 20 is provided with a recess that is open at the upper end, and receives a battery main body 100 consisting of a plurality of battery cells 98 therein. As shown in FIG. 8, the battery main body 100 includes a front wall, a bottom wall, a left wall, a right wall and a rear wall, and is formed as a rectangular container with an open top. The battery main body 100 has a fore and aft length which is smaller than that of the battery receiving recess 40, and a lateral width substantially equal to that of the battery receiving recess 40.

As shown in FIG. 6, the battery 20 further includes a battery cover 102 connected to the battery main body 100 and closing the open upper end of the battery main body 100. In the illustrated embodiment, the battery cover 102 is engaged by the front and rear walls of the battery main body 100 at the front and rear edges thereof, respectively. As shown in FIG. 7, the rear end of the battery cover 102 is provided with a grip 104 connected to a part thereof adjacent to the upper surface of the battery main body 100, and formed substantially in the shape of letter U. The upper front end of the battery cover 102 is provided with a cover protrusion 108 that protrudes forward. As shown in FIG. 8, the lower surface of the cover protrusion 108 is slanted downward toward the rear.

As shown in FIG. 8, the bottom surface of the battery main body 100 is provided with a pair of guide ribs 110 that are spaced apart from each other in a symmetric arrangement about the symmetry plane Y. The guide ribs 110 each include a front guide rib 110F provided in a front part of the bottom surface of the battery main body 100, and a rear guide rib 110B provided in a rear part of the bottom surface of the battery main body 100. The front guide ribs 110F extend forward from a prescribed rear point of the bottom surface of the battery main body 100, and project from the front end of the bottom surface of the battery main body 100. The rear guide ribs 110B extend rearward from a prescribed point behind the rear ends of the front guide ribs 110F to the rear end of the bottom surface of the battery main body 100. The rear ends of the front guide ribs 110F and the front ends of the rear guide ribs 110B are determined such that the projecting ends of the first biasing members 80 are located between the rear ends of the front guide ribs 110F and the front ends of the rear guide ribs 110B. The height of the front guide ribs 110F as measured from the bottom surface of the battery main body 100 is equal to that of the rear guide ribs 110B.

To each front guide rib 110F is connected a front surface rib 112 that extends upward from the front end of the front guide rib 110F to a vertically intermediate point on the front surface of the battery main body 100. The height of each front surface rib 112 from the front surface of the battery main body 100 is substantially equal to the height of the guide ribs 110 from the bottom surface of the battery main body 100, and smaller than the height of the guide rails 60 from the placing surface 42. The inwardly facing surfaces of the front guide ribs 110F, the rear guide ribs 110B and the front surface ribs 112 are flush with one another on either side of the battery main body 100.

Thus, the front guide ribs 110F are provided with inwardly facing front guide surfaces 114F, and the rear guide ribs 110B are provided with inwardly facing rear guide surfaces 114B. The left front guide surface 114F and the left rear guide surface 114B are flush with each other, and these guide surfaces may be collectively referred to as left guide surface 114 in the following disclosure. Similarly, the right front guide surface 114F and the right rear guide surface 114B are flush with each other, and these guide surfaces may be collectively referred to as right guide surface 114 in the following disclosure. The spacing between the right and left guide surfaces 114 is substantially equal to the distance between the right and left guide surfaces 62 of the front end parts of the guide rails 60.

A pair of first bottom surface engaging portions 120 project from a rear end part of the bottom surface of the battery main body 100 so as to extend laterally by a prescribed length adjacent to the inner sides of the two rear guide ribs 110B. The first bottom surface engaging portions 120 are substantially trapezoidal in side view, and are each provided with a forwardly facing engagement surface 124. The height of the first bottom surface engaging portions 120 is substantially equal to that of the guide ribs 110.

A second bottom surface engaging portion 122 having a trapezoidal shape in side view and having a substantially same height from the bottom surface as the guide ribs 110 projects centrally from a front end part of the lower surface of the battery main body 100. The second bottom surface engaging portion 122 is positioned with respect to the fore and aft direction so that the rear end of the second biasing member 82 engages the projecting surface of the second bottom surface engaging portion 122 when the battery 20 is fully received in the battery tray 19. The sloping front wall and the sloping rear wall of the second bottom surface engaging portion 122 are defined by a plurality of ribs extending in the fore and aft direction and connected to the bottom surface of the second bottom surface engaging portion 122.

As shown in FIG. 8, a lower part of the front wall of the battery main body 100 is centrally provided with a recess 130 which is recessed in an upper and rearward direction. The recess 130 is defined by an upper wall, a rear wall, a left wall and a right wall, and the rear wall is provided with a terminal protection portion 130A. As shown in FIG. 7, the terminal protection portion 130A includes a plurality of terminal protection pieces 130B consisting of wall portions projecting forward from a vertically central part of the recess 130. The front ends of the terminal protection pieces 130B project forward so as to be flush with the front end surface of the battery main body 100 in bottom view. The terminal protection pieces 130B which are eight in number are arranged on the rear wall of the recess 130 at a regular interval in the lateral direction, and centered about the symmetry plane Y. The lateral side surfaces of each terminal protection piece 130B are each formed with a linear recess extending in the fore and aft direction. The rear wall of the recess 130 is provided with a plurality of openings between the adjoining terminal protection pieces 130B and adjacent to the outer sides of the laterally outermost terminal protection pieces 130B, and these openings communicate with the interior of the battery main body 100.

Figure 9:
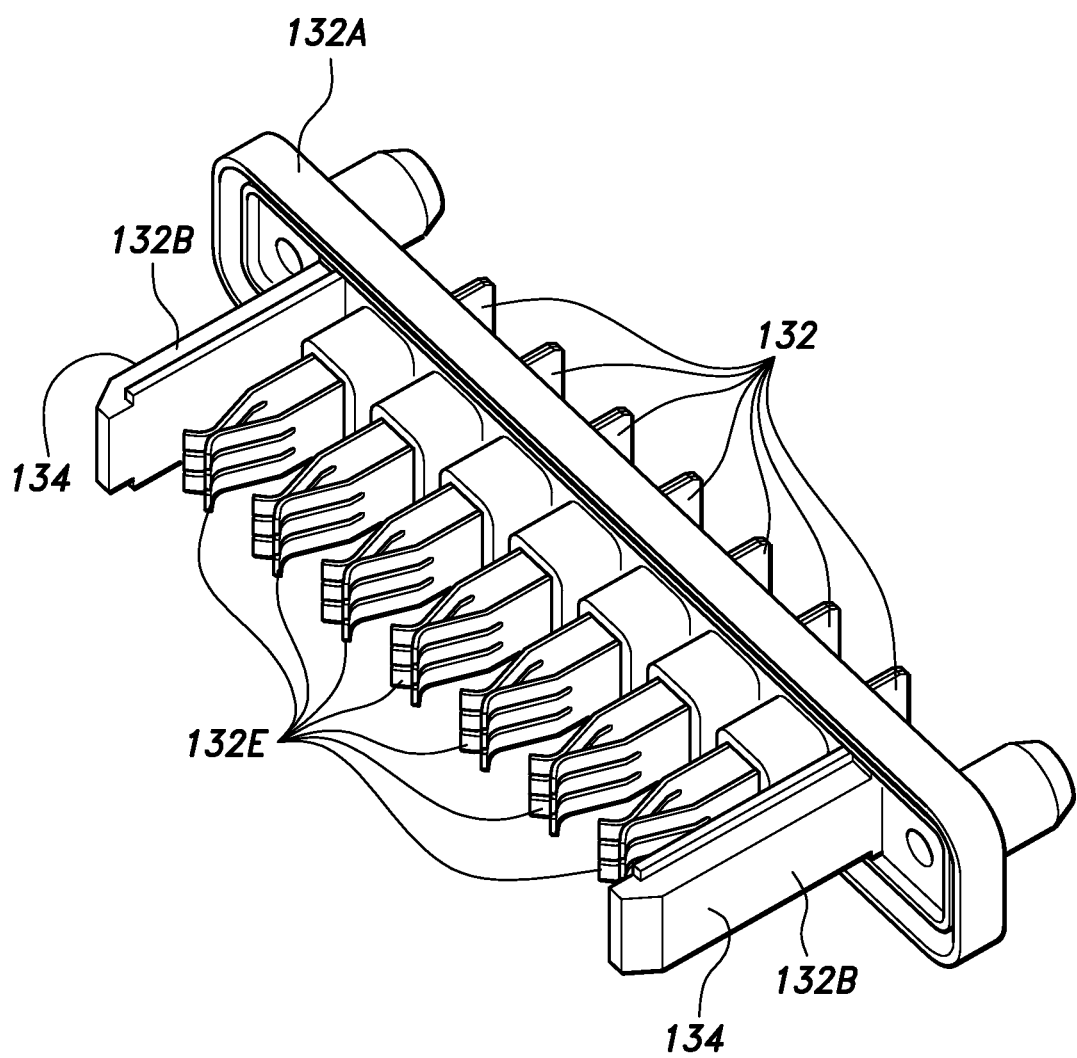
FIG. 9 is a perspective view of electric power receiving terminals.

As shown in FIG. 8, a laterally extending electric power feeding terminal plate 132A made of electrically insulating material is attached to the rear surface of the rear wall of the recess 130 which is positioned within the battery main body 100. As shown in FIG. 9, a plurality of electric power feeding terminals 132 pass through the electric power feeding terminal plate 132A. Each electric power feeding terminal 132 includes a pair of sheet spring portions 132E extending forward, and contacting each other at the front ends. The electric power feeding terminals 132 are arranged laterally at an interval substantially equal to the interval between the electric power receiving terminals 44. A pair of electric power feeding terminal guide pieces 132B project forward on outer sides of the outermost electric power feeding terminals 132, beyond the front ends the of the electric power feeding terminals 132. The projecting length of the electric power feeding terminal guide pieces 132B from the electric power feeding terminal plate 132A is substantially equal to the projecting length of the terminal protection pieces 130B from the rear wall of the recess 130. The electric power feeding terminal guide pieces 132B are each provided with an electric power feeding terminal guide surface 134 on a laterally outer side surface thereof, and the two electric power feeding terminal guide surfaces 134 are configured to come closer to each other toward the front ends thereof.

As shown in FIG. 7, the electric power feeding terminals 132 project forward through the openings formed in the rear wall of the recess 130 provided between the adjoining terminal protection pieces 130B, and through the openings formed on either lateral side of the laterally outermost terminal protection pieces 130B. Each electric power feeding terminal guide piece 132B is received in the recess provided on the laterally outer side of the corresponding terminal protection piece 130B, and extends to a part corresponding to the front end of the terminal protection portion 130A. The sheet spring portions 132E of each electric power feeding terminal 132 are received in the recesses formed in the opposing side surfaces of the corresponding mutually adjoining terminal protection pieces 130B at the rear ends of the sheet spring portions 132E, and extend forward. The front ends of the sheet spring portions 132E of each electric power feeding terminal 132 contact each other in a laterally central point between the corresponding mutually adjoining terminal protection pieces 130B.

To a lower central part of the front end of the battery main body 100 is connected a front engagement portion 136 consisting of a plate member projecting forward. The front engagement portion 136 is located under the electric power feeding terminals 132 so that a certain spacing is created between the electric power feeding terminals 132 and the front engagement portion 136.

A corresponding engagement portion 140 projects rearward from the rear end of the battery main body 100. The corresponding engagement portion 140 is configured to be engaged by an engagement claw provided in an upper end of the latch member 55.

The lower surface of the battery main body 100 is connected to each side surface of the battery main body 100 via a smooth curved surface that slants laterally inward toward the lower part thereof. An engagement projection 116 is provided on each curved surface so as to extend between the rear end of the front guide rib 110F and the front end of the rear guide rib 110B on the corresponding side, and project from the curved surface downward and flush with the bottom surface of the battery main body 100.

The curved surface extending between the lower surface and each side surface of the battery main body 100 is further provided with a plurality of inlet openings 160 and outlet openings 162 for introducing and removing air into and out of the battery main body 100, respectively, for cooling the battery cells 98 therein.

The mode of operation of the electric mower 1, in particular the mode of installing and removing the battery 20 is described in the following.

State of Battery During Normal Operation

During normal operation of the electric mower 1, the battery 20 is received in the battery receiving recess 40 of the battery tray 19 as shown in FIG. 1.

Figure 10:
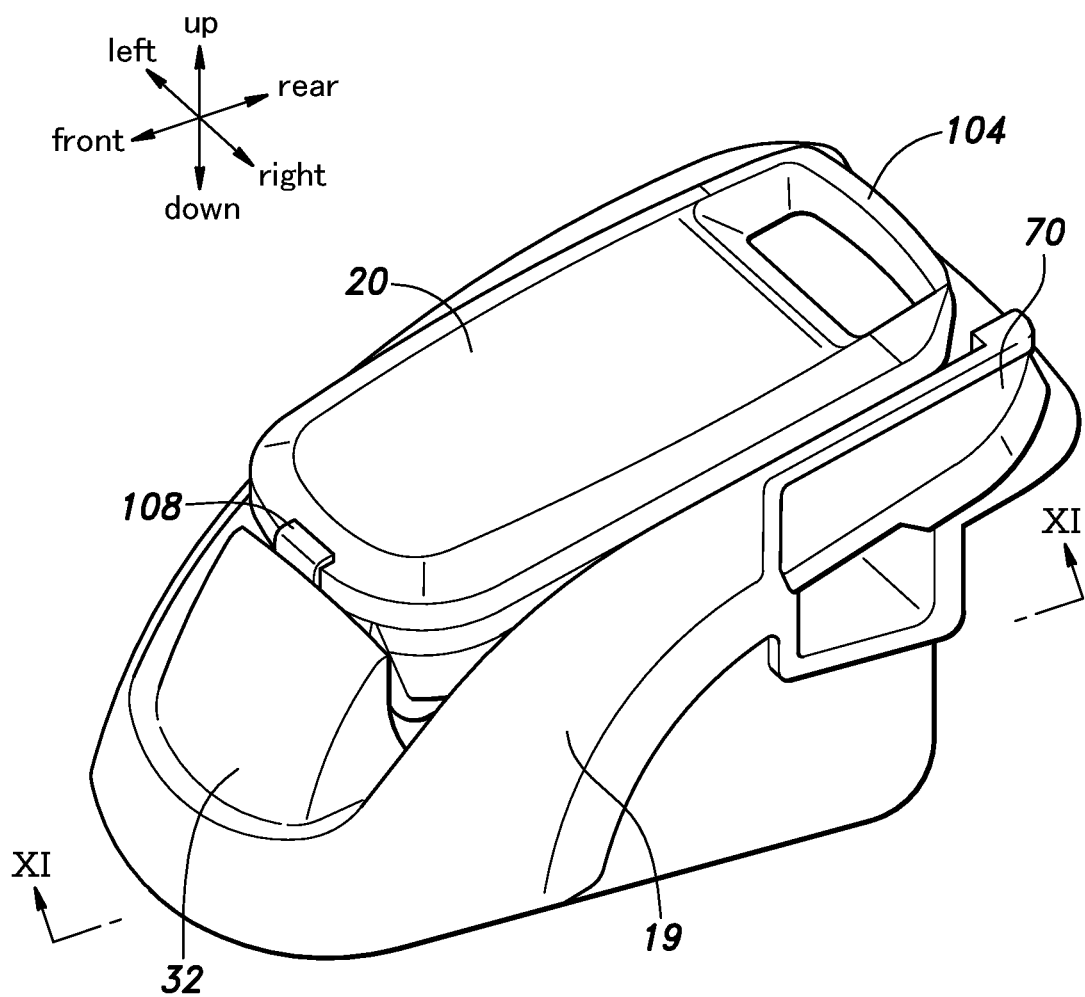
FIG. 10 is a perspective view of the battery received in a battery receiving recess.
Figure 11:
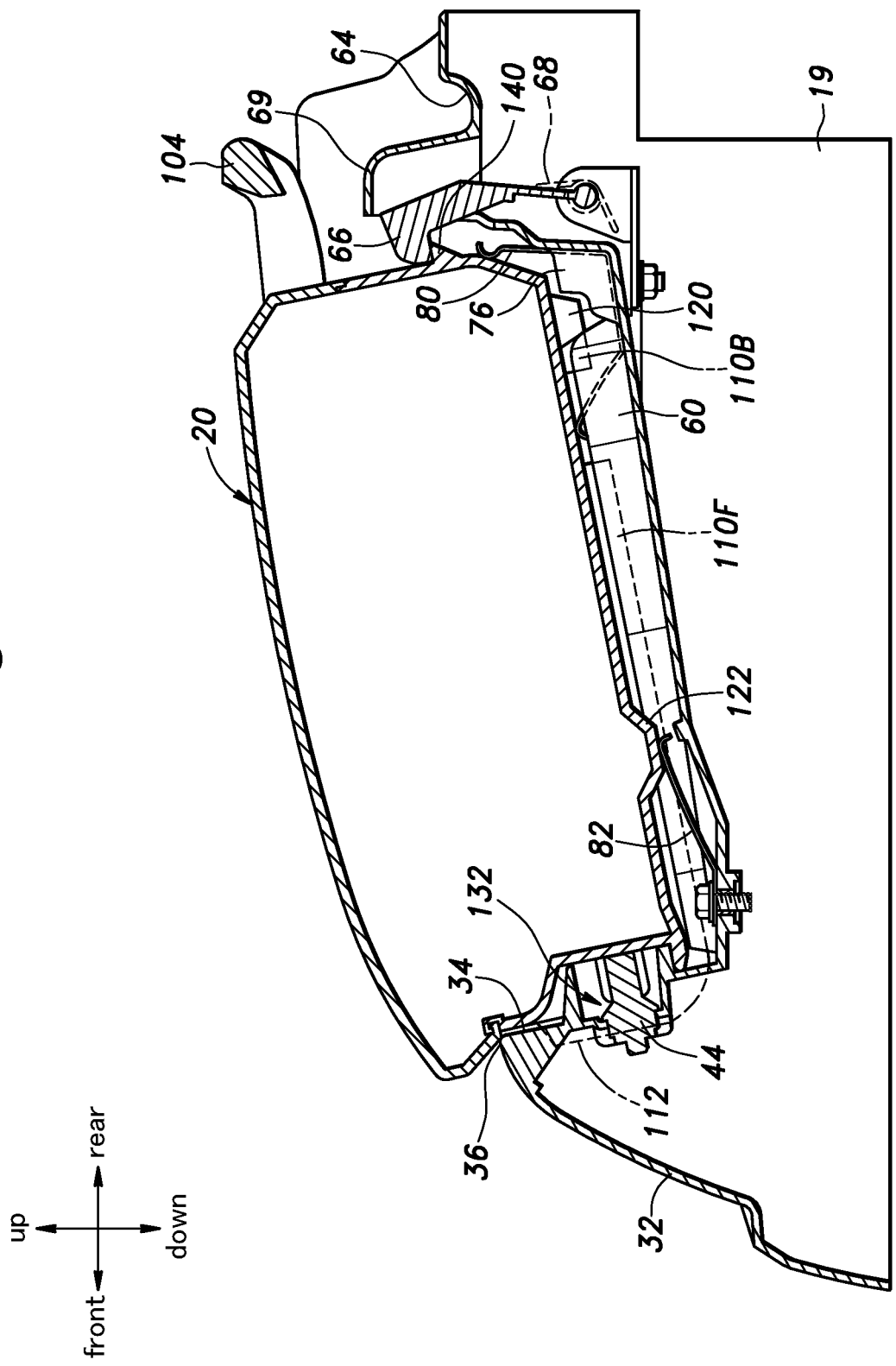
FIG. 11 is a sectional view taken along line XI-XI of FIG. 10.
Figure 12:
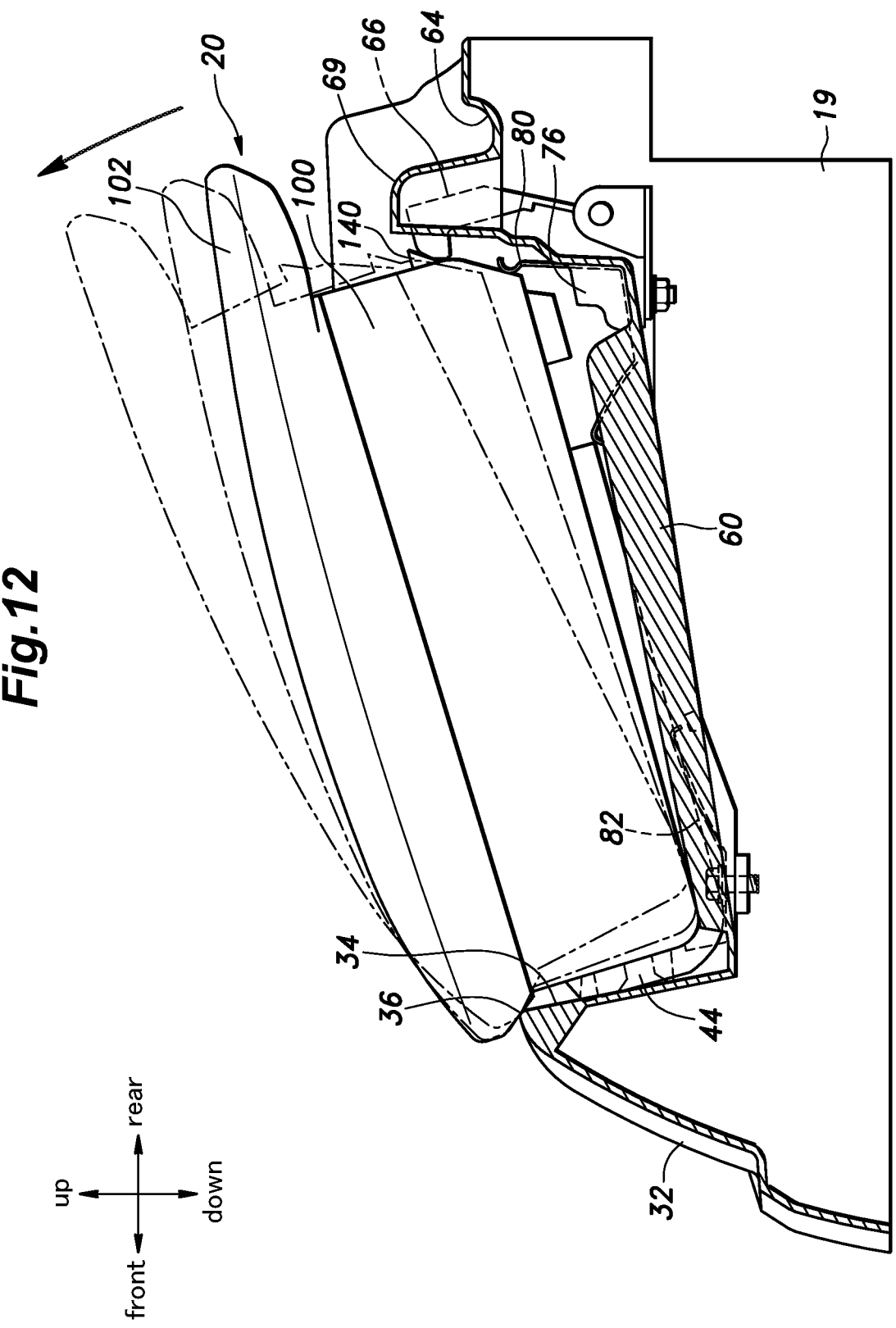
FIG. 12 is a view illustrating the transition of the states of the battery including a state where the rear end of the battery is raised upon pressing a battery removal button (solid lines), a state where the rear end of the battery is lifted (one-dot chain-dot lines) and a state where the battery has cleared the rear edge of the battery receiving recess (double-dot chain-dot lines)

As shown in FIGS. 10 and 11, when the battery 20 is received in the battery receiving recess 40, the grip 104 of the battery 20 is received in the rear recess 64, and the battery main body 100 is received in the battery receiving recess 40. At this time, the lower surface of the battery main body 100 is placed on the placing surface 42 and supported by the guide rails 60 such that the part of the bottom surface of the battery main body 100 located between the front guide ribs 110F and the rear guide ribs 110B abuts onto the upper surfaces of the guide rails 60. Further, the electric power feeding terminals 132 are electrically connected to the electric power receiving terminals 44.

Further, the free ends of the first biasing members 80 abut the lower surface of the engagement projections 116 to urge the battery 20 upward, and the base ends of the first biasing members 80 abut the rear end surface of the battery main body 100 to urge the battery 20 forward. The second biasing member 82 abuts the lower surface of the main part of the second bottom surface engaging portion 122 to urge the battery 20 upward. Against the upward component of this biasing force, the engagement claw of the latch member 33 projects into the battery receiving recess 40 and engages the corresponding engagement portion 140 to restrict the upward movement of the rear end of the battery 20, and the engagement between the front engagement portion 50 and the corresponding front engagement portion 136 restricts the upward movement of the front end of the battery 20. Thus, the battery 20 is prevented from projecting upward from the battery receiving recess 40, and firmly retained in the battery receiving recess 40.

Removal of Battery

The battery 20 is removed by a user as required such as when the battery 20 becomes low in charge.

When removing the battery 20, the user depresses the battery removal switch 70, and this causes the locking claw of the latch member 66 to move rearward, and to disengage the corresponding engagement portion 140. As a result, the rear portion of the battery 20 is allowed to move upward under the spring force of the first biasing members 80 and the second biasing member 82 so that the corresponding engagement portion 140 abuts onto the upper surface of the engagement claw of the latch member 66 (as indicated by the solid lines in FIG. 12).

The user then holds the grip 104 of the battery 20 and lifts the rear end of the battery 20 until the rear end of the battery 20 clears the rear edge of the battery receiving recess 40. At this time, the state of the battery 20 where the corresponding engagement portion 140 abuts onto the upper surface of the engagement claw of the latch member 66 (solid lines in FIG. 12) is taken over by the state of the battery 20 where the front end of the battery 20 rolls over the supporting surface 36 (solid lines in FIG. 12), and then by the state of the battery 20 where the rear end of the battery 20 clears the rear edge of the battery receiving recess 40 (double-dot chain-dot lines in FIG. 12). At this time, the battery 20 rotates such that the lower surface of the cover protrusion 108 contacts the supporting surface 36 and rolls over the supporting surface 36.

Figure 13:
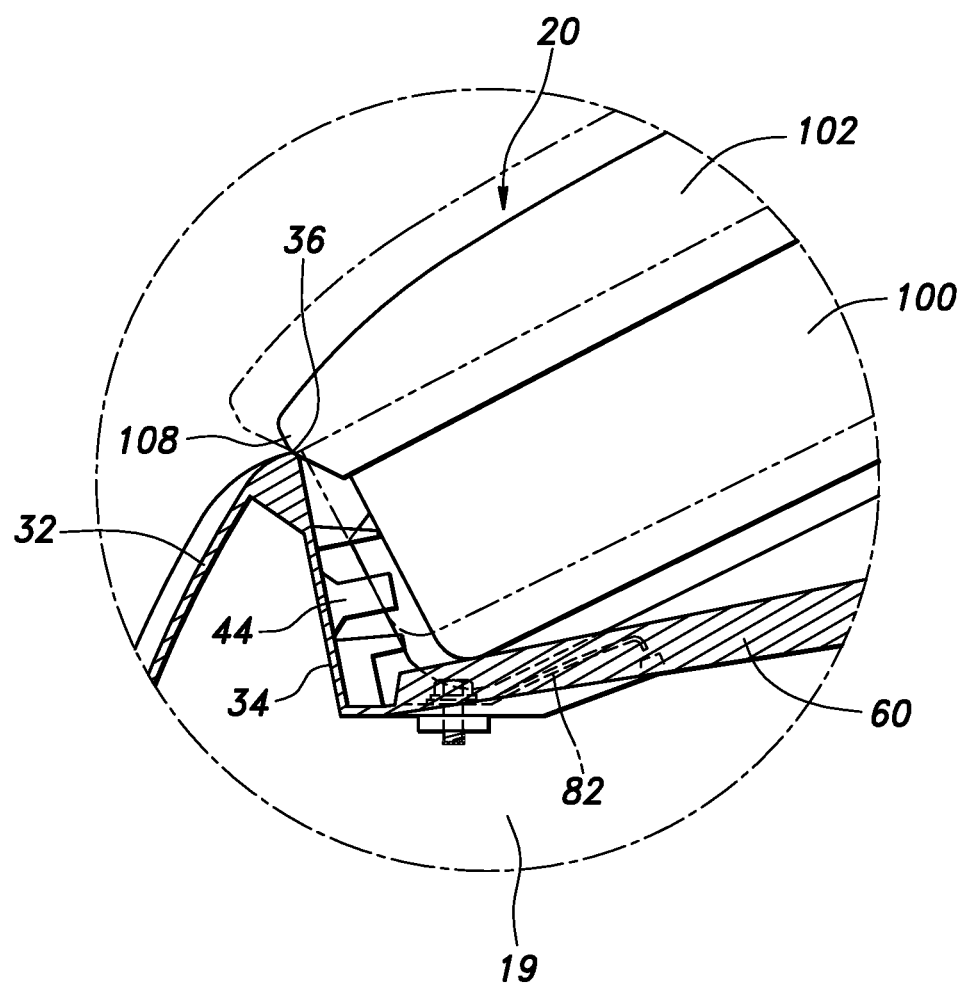
FIG. 13 is a view illustrating the transition of the states of the battery including a state where the battery has rotated while the lower surface of a cover protrusion is in contact with a supporting surface (one-dot chain-dot lines) and a state where a lower part of the front end of the battery has come into contact with the bottom of the battery receiving recess (solid lines)

The supporting surface 36 and the cover protrusion 108 may be configured such that as the battery 20 rotates by rolling along the supporting surface 36 as shown in FIG. 13, the battery 20 may move rearward and downward from the state where only pure rotation is involved (double-dot chain-dot lines in FIG. 13) to the state where the lower part of the front end abuts the bottom of the battery receiving recess 40 while the lower surface of the cover protrusion 108 and the supporting surface 36 are kept in contact (solid lines in FIG. 13).

The user holding the grip 104 pulls the battery 20 upward, and this causes the battery 20 to rotate until the front face of the battery 20 faces downward. As the user further lifts the battery 20, the front end of the battery 20 leaves the bottom surface of the battery receiving recess 40, and is removed out of the battery receiving recess 40.

Installing Battery

The battery 20 is installed in the battery receiving recess 40 by the user as required. When installing the battery 20, the user holds the grip 104, and transports the battery 20 onto the placing surface 42 of the battery receiving recess 40. At this time, the front surface of the battery 20 faces downward under the gravitational force.

Figure 14:
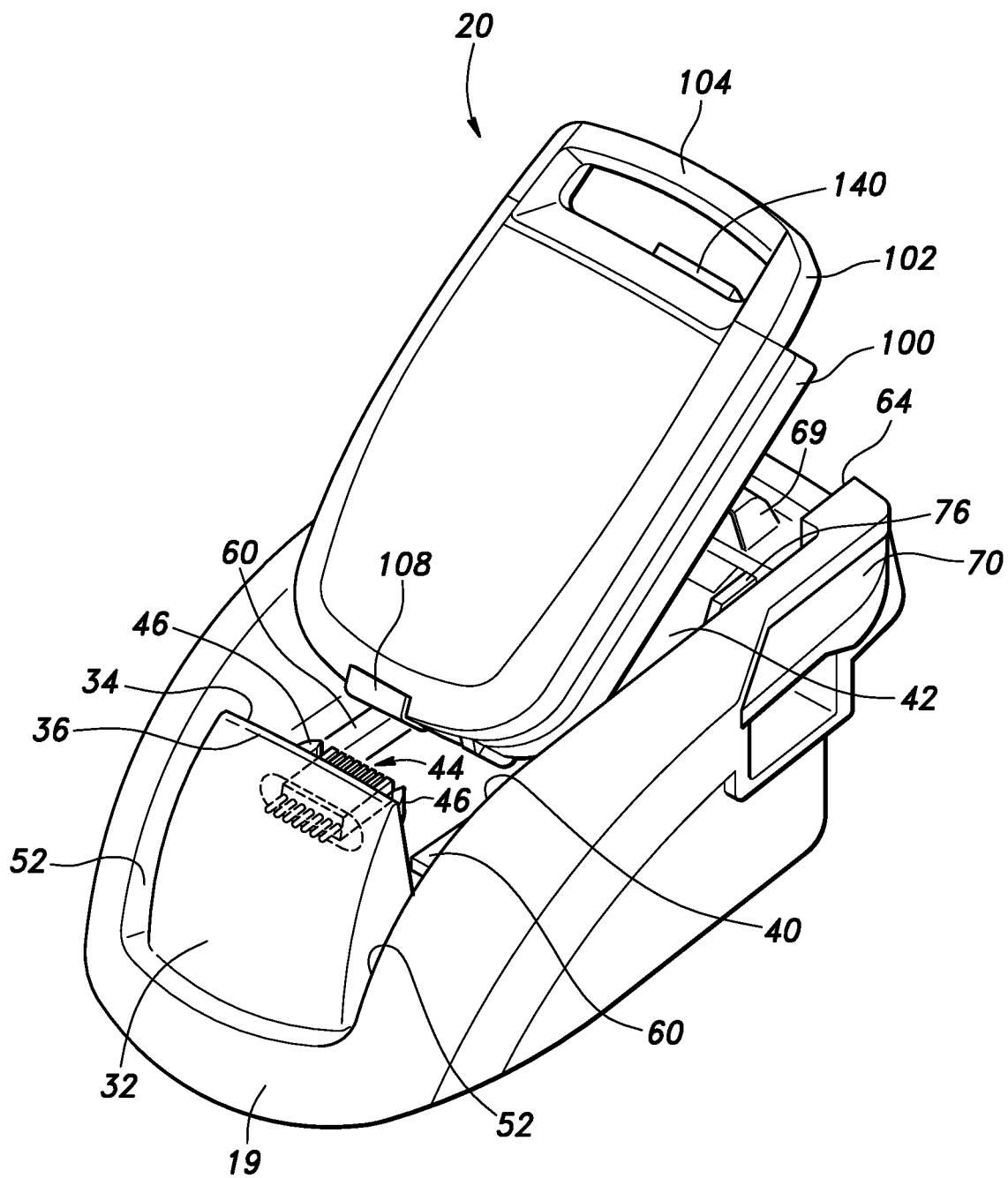
FIG. 14 is a perspective view of the mower when the battery is being placed into the battery receiving recess.
Figure 15:
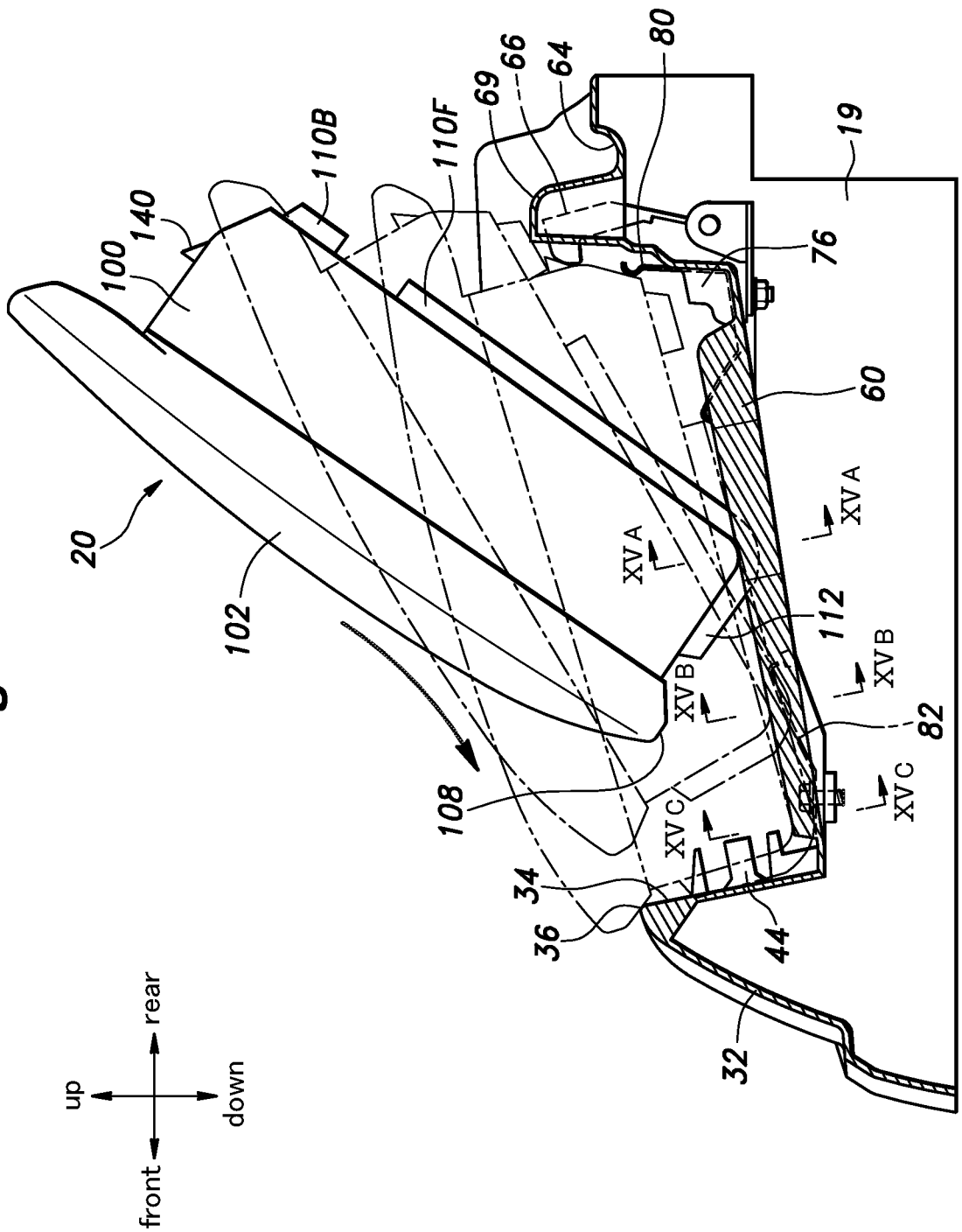
FIG. 15 is a view illustrating the transition of the states of the battery including a state where a lower part of the front end of the battery has come into contact with the battery receiving recess (solid lines), a state where the battery has slid forward (one-dot chain-dot lines), and a state where a corresponding engagement portion has come into contact with a latch member (broken lines)
Figure 16A:
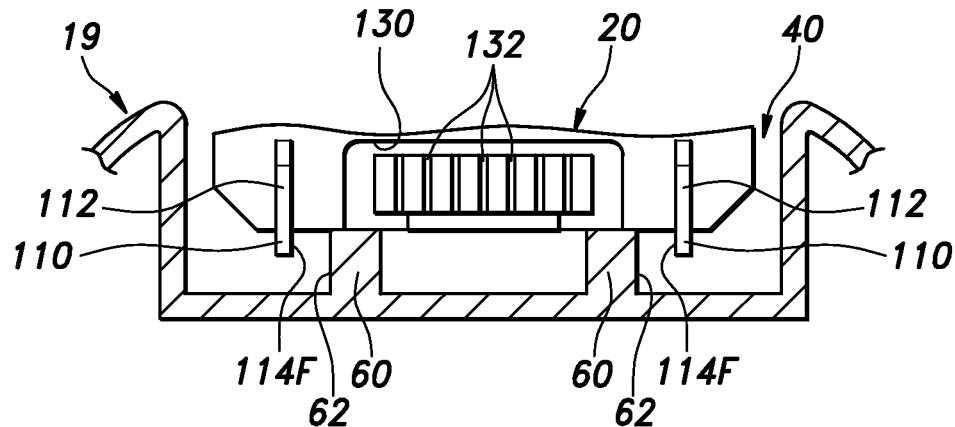
FIG. 16A, FIG. 16B and FIG. 16C are sectional views taken along line XVIA-XVIA, XVIB-XVIB and XVIC-XVIC of FIG. 15, respectively.

The user then places the battery 20 on the placing surface 42 such that the front surface of the battery 20 abuts the upper surfaces of the guide rails 60 (solid lines in FIG. 15) such that the front surface of the battery 20 is positioned laterally centrally, and so as to be in an intermediate region M with respect to the fore and aft direction with respect to the placing surface 42 as shown by the solid lines in FIGS. 14 and 15. As shown in FIG. 16A, the guide surfaces 62 on either side are both located between the guide surfaces 114 such that the left guide surfaces 62 and 114 oppose each other, and the right guide surfaces 62 and 114 oppose each other. Therefore, the left guide surfaces 62 and 114 jointly restrict the rightward movement of the battery 20, and the right guide surfaces 62 and 114 jointly restrict the leftward movement of the battery 20. The left guide surfaces 62 and 114 are spaced from each other, and the right guide surfaces 62 and 114 are similarly spaced from each other so that the lateral movement of the battery 20 is restricted to be within a prescribed range.

In order to insert the battery 20, the user then reduces the force applied to the grip 104 to such an extent that the battery 20 moves downward as shown by the one-dot chain-dot line of FIG. 15. As a result, the lower part of the front end of the battery 20 slides forward along the upper surfaces of the guide rails 60 as the battery 20 moves downward. Owing to the forward sliding movement of the lower part of the front end of the battery 20, the battery 20 rotates around a hypothetical axial line extending laterally adjacent to the grip 104. The battery 20 then slides forward along the upper surfaces of the guide rails 60 until the lower surface of the corresponding engagement portion 140 of the battery 20 comes into contact with the upper end of the latch member 66 as indicated by the double-dot chain-dot line shown in FIG. 12.

Figure 16B:
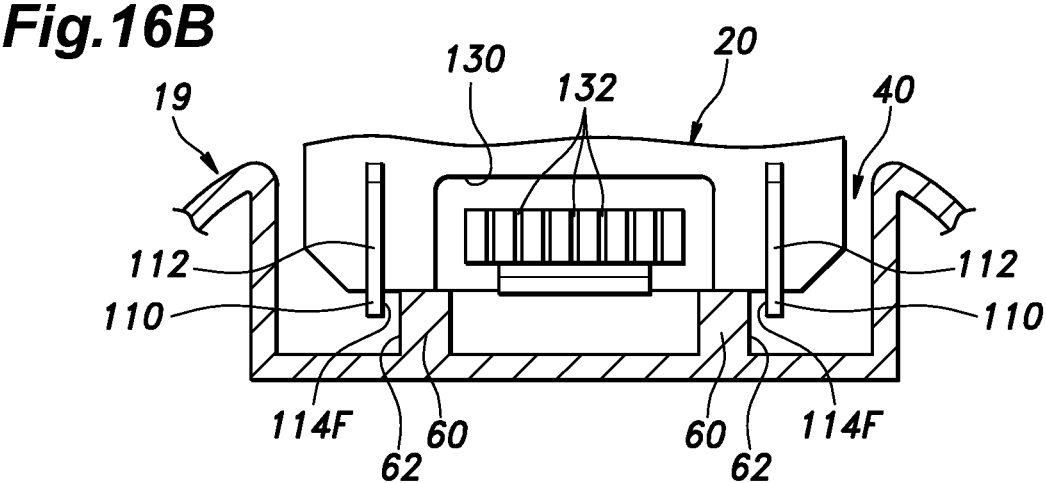

When the front part of the bottom of the battery 20 slides forward along the upper surfaces of the guide rails 60, the guide surfaces 62 are spaced from the respective guide surfaces 114 as shown in FIG. 16B, similarly as was the case with FIG. 16A. However, the distance between the guide surfaces 114 from the guide surfaces 62 in the case of FIG. 16B is smaller than that in the case of FIG. 16A. Therefore, the laterally movable range of the battery 20 in the case of FIG. 16B is smaller than that in the case of FIG. 16A.

Figure 16C:
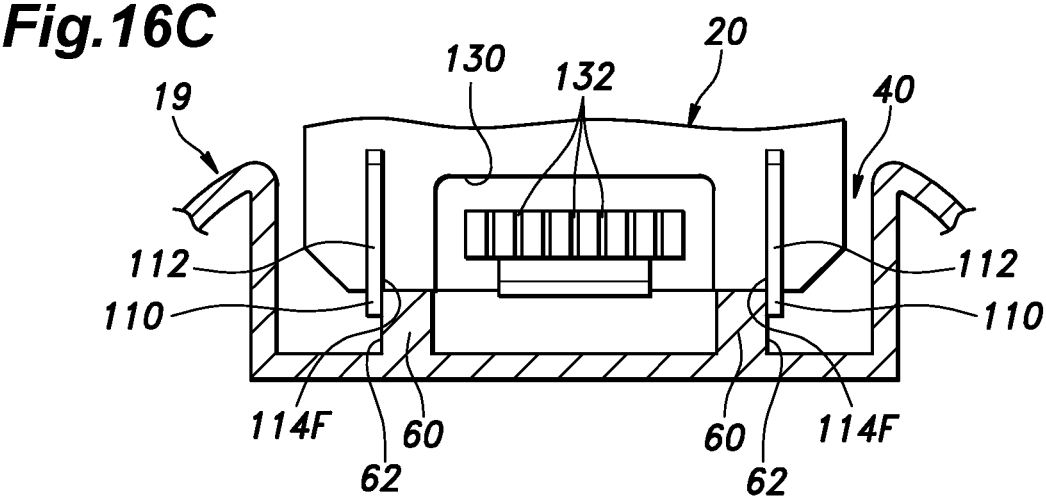
Figure 17:
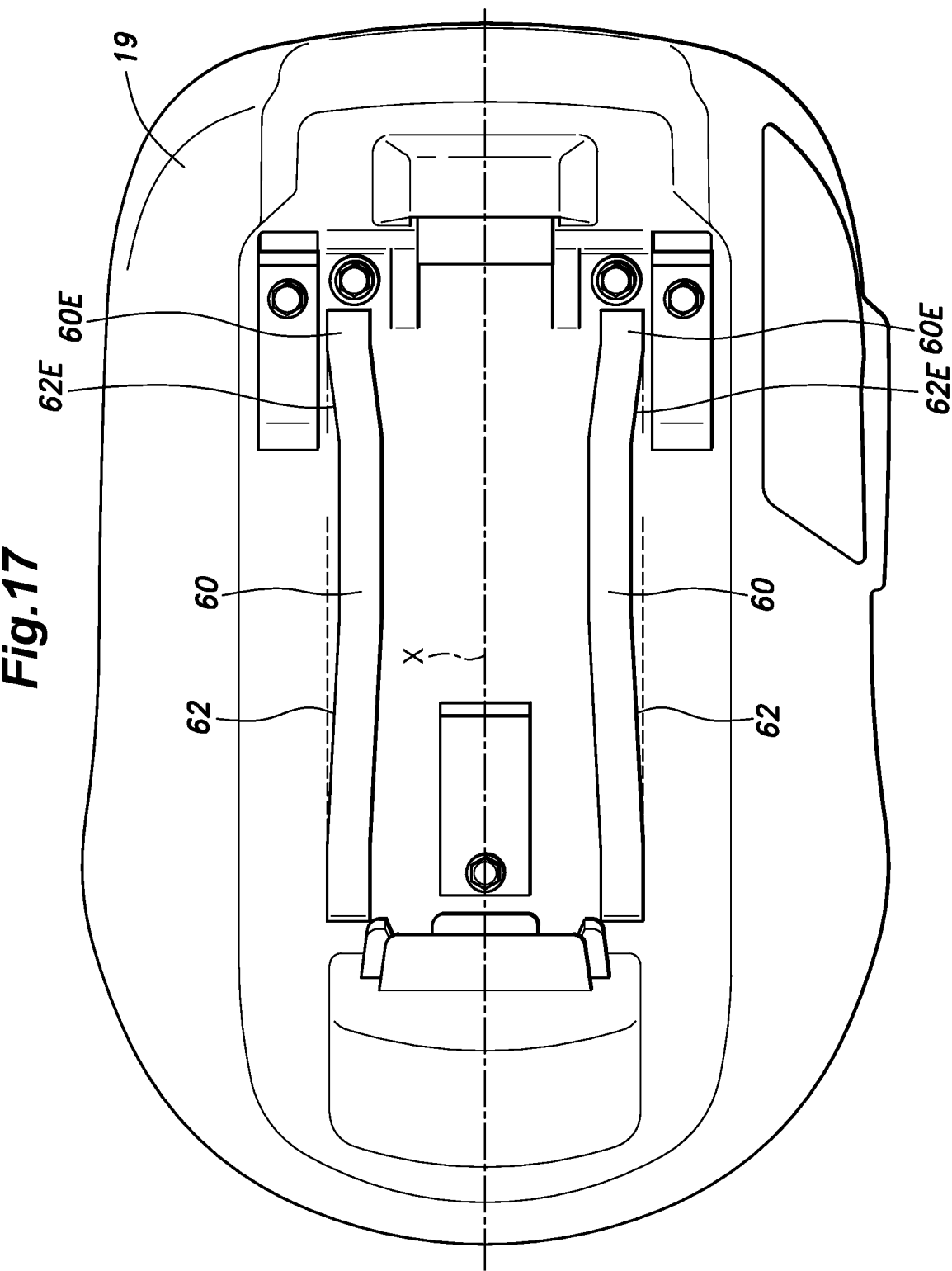
FIG. 17 is a simplified plan view showing the trajectory of a corresponding guide surface as the battery is inserted, and completely received in the battery receiving recess.

The change in the range of lateral movement of the battery 20 is clearly shown in FIG. 17. The trajectory of the front end of the guide surface 114 as the front surface of the battery 20 slides forward while kept in contact with the upper surfaces of the guide rails 60 until the battery 20 is fully received in the battery receiving recess 40 is shown by the broken lines in FIG. 16. As shown in FIG. 17, as the front surface of the battery 20 moves forward, the left guide surface 62 comes closer to the left guide surface 114, and the right guide surface 62 comes closer to the right guide surface 114. Therefore, as the front surface of the battery 20 moves forward, the laterally movable range of the battery 20 gets smaller so that the battery 20 is guided toward the laterally central position on the battery receiving recess 40.

Figure 18:
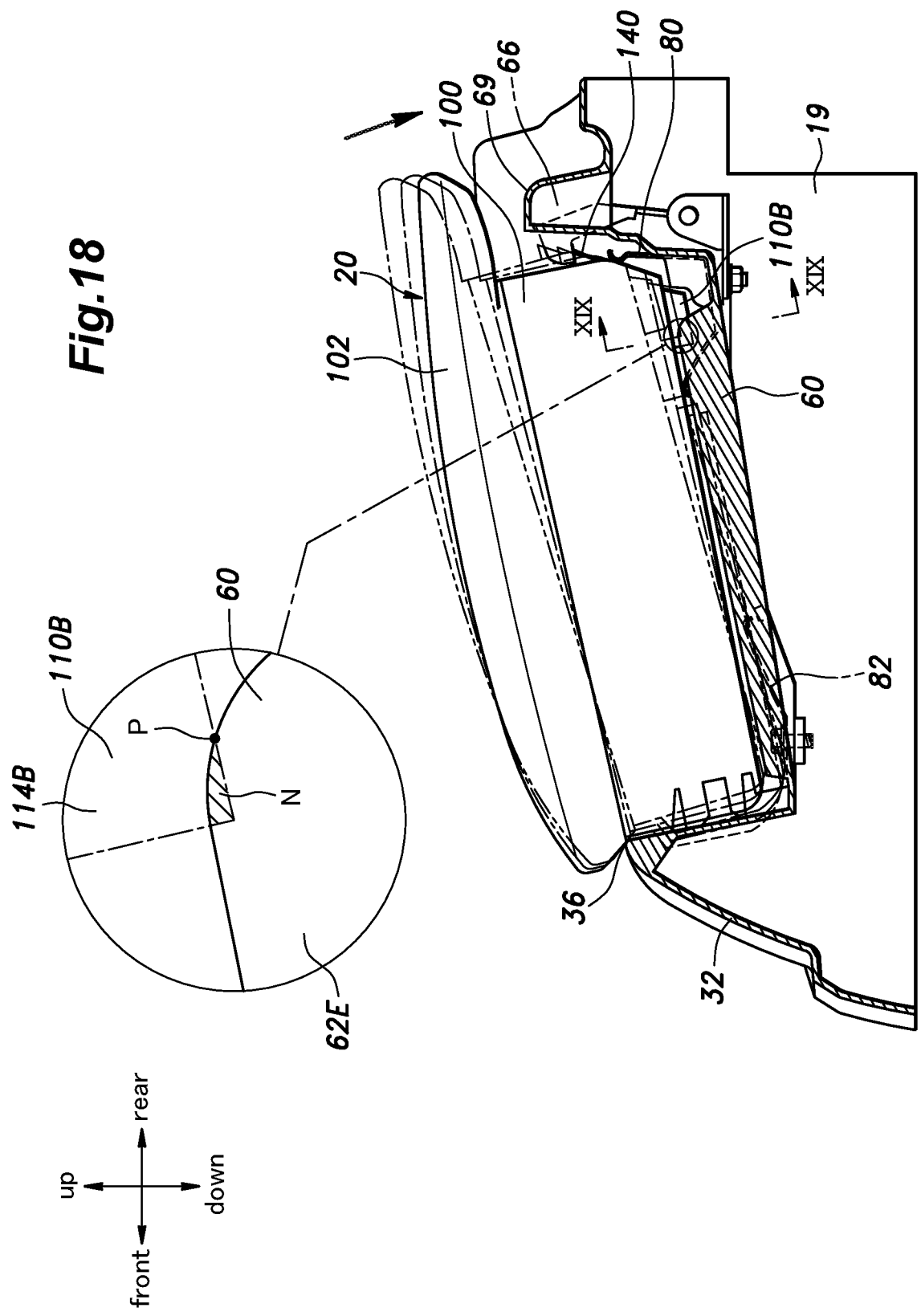
FIG. 18 is a view illustrating the transition of the states of the battery including a state where the corresponding engagement portion has come into contact with the latch member (solid lines), a state where the battery has rotated by a prescribed angle (one-dot chain-dot lines), and a state where the battery is completely received in the battery receiving recess (double-dot chain-dot lines)

Once the lower surface of the corresponding engagement portion 140 of the battery comes into contact with the upper end of the latch member 66, the user pushes the rear end of the battery 20 into the battery receiving recess 40 as shown in FIG. 18.

Figure 19:
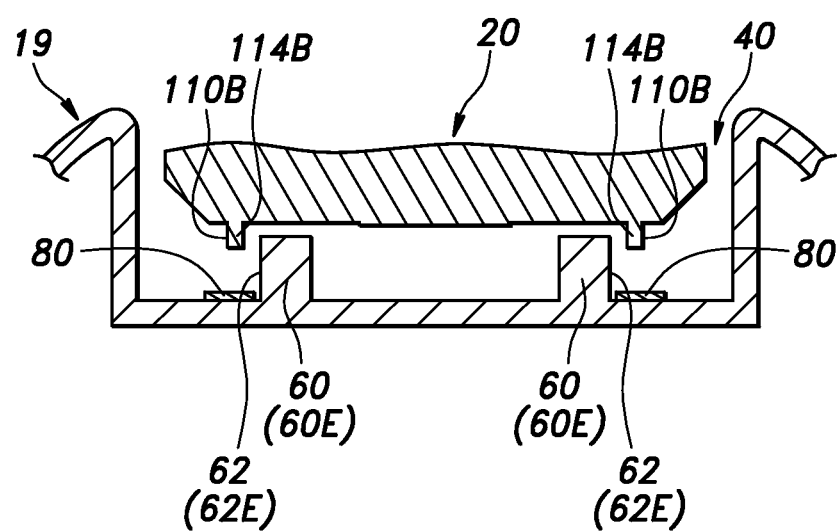
FIG. 19 is a sectional view taken along line XIX-XIX of FIG. 18.

FIG. 18 shows the transition of the states of the battery 20 from the state where the lower surface of the corresponding engagement portion 140 has come into contact with the upper end of the latch member 66 (solid lines in FIG. 18), to the state where the battery 20 has rotated by a prescribed angle (one-dot chain-dot lines in FIG. 18), and to the state where the battery 20 is fully received in the battery receiving recess 40 (double-dot chain-dot lines in FIG. 18). As indicated by the one-dot chain-dot lines in FIG. 18, when the battery 20 has rotated by a prescribed angle, a region N where the rear guide ribs 110B of the battery and the guide member auxiliary surfaces 62E overlap with one another is created. At this time, as shown in FIG. 19, in the region N, the right guide member auxiliary surface 62E opposes the right guide surface 114, and the left guide member auxiliary surface 62E opposes the left guide surface 114. As a result, the lateral movement of the rear part of the battery 20 is limited within a prescribed range.

The one-dot chain-dot lines in FIG. 17 indicates the trajectory of the rearmost point (point P in FIG. 17B) of the region N (region N in FIG. 17B) where the rear guide ribs 110B of the battery and the guide member auxiliary surfaces 62E overlap with each other in side view during the time the battery 20 is inserted.

As the battery 20 rotates in a rearwardly slanting movement, the region N where the rear guide ribs 110B of the battery and the guide member auxiliary surfaces 62E overlap with each other increases in size in the fore and aft direction. Because the guide member auxiliary surfaces 62E exist between the rear guide ribs 110B, and the guide member auxiliary surfaces 62E are progressively spaced apart from each other toward the rear, the distance between the right guide surfaces 62 and 114 and the distance between the left guide surfaces 62 and 114 both decreases during this time. As a result, the battery 20 rotates in a rearward slanting movement, the laterally moveable range of the rear part of the battery 20 decreases, and the rear part of the battery is laterally centered on the placing surface 42 in a progressive manner.

As shown in FIG. 15, the electric power feeding terminals 132 are inserted into the respective electric power receiving terminals 44 from above as the front end of the bottom of the battery 20 slides forward along the upper surfaces of the guide rails 60 until the battery 20 is fully received in the battery receiving recess 40. At this time, the electric power feeding terminals 132 and the respective electric power receiving terminals 44 may be laterally misaligned with one another as shown in FIG. 20A. FIG. 20A shows a case where the respective electric power receiving terminals 44 are offset from the electric power feeding terminals 132 in a leftward direction.

The rear ends of the electric power receiving terminal guide surfaces 48 have inclined surfaces that come inwardly closer to each other toward the front, and the front ends of the electric power feeding terminal guide surfaces 134 have inclined surfaces that are progressively spaced apart from each other toward the rear. When the electric power receiving terminals 44 are inserted into the electric power feeding terminals 132, and the electric power receiving terminal guide surfaces 48 come into contact with the electric power feeding terminal guide surfaces 134 as shown in FIG. 20B, the electric power receiving terminals 44 receive a force including a lateral component from the battery 20. Since the electric power receiving terminals 44 are supported in the electric power receiving part 32 in a floating manner, the electric power receiving terminal plate 44B is moved laterally in a corresponding manner. As shown in FIGS. 20C and 20D, as the electric power receiving terminal guide pieces 46 slide over the electric power feeding terminal guide surfaces 134, the electric power receiving terminal plate 44B moves laterally until the electric power receiving terminals 44 are each received between the pair of the sheet spring portions 132E of the corresponding electric power feeding terminal 132. Once the battery 20 is fully received in the battery receiving recess 40, all of the seven electric power receiving terminals 44 are received between the corresponding pair of the sheet spring portions 132E, and the two surfaces of each electric power receiving terminal 44 extending along the major plane is brought into contact with the respective sheet spring portions 132E. The electric power receiving terminals 44 are thus brought into electric contact with the corresponding electric power feeding terminal 132.

The electric mower 1 is thus provided with a battery mounting structure for electrically connecting the battery 20 to the main body 2 that includes the main body 2, the battery 20, the electric power feeding terminal plate 132A, the electric power feeding terminals 132, the electric power feeding terminal guide pieces 132B, the electric power receiving terminal plate 44B, the electric power receiving terminals 44, and the electric power receiving terminal guide pieces 46.

The corresponding engagement portion 140 keeps the latch member 66 pushed rearward against the biasing force from the time the lower surface of the corresponding engagement portion 140 has come into contact with the upper end of the latch member 66 until the battery 20 is received in the battery receiving recess 40. Once the battery 20 is received in the battery receiving recess 40, the engagement claw of the latch member 66 moves forward so that the engagement claw of the latch member 66 becomes engaged with the corresponding engagement portion 140. As a result, the battery 20 is retained in the battery receiving recess 40, and the installing of the battery 20 is completed.

Owing to the presence of the guide surfaces 62 located between the guide surfaces 114, when the battery 20 is received in the battery receiving recess 40, as shown in FIG. 16, the front ends of the guide surfaces 62 engage with the front ends of the guide surfaces 114 so that the lateral movement of the front part of the battery 20 is restricted, and the rear ends of the guide surfaces 62 engage with the rear ends of the guide surfaces 114 so that the lateral movement of the rear part of the battery 20 is restricted. Therefore, owing to the presence of the guide surfaces 62 and the corresponding guide ribs 110, the lateral movement of the battery 20 in either direction is restricted.

The effect of the electric mower 1 of the illustrated embodiment is discussed in the following.

When the user is about to raise the rear end of the battery 20, the battery 20 can be supported by the main body 2 by abutting the lower surface of the cover protrusion 108 onto the supporting surface 36 provided on the upper edge of the front wall of the battery receiving recess 40. Therefore, when removing the battery 20 from the battery receiving recess 40, the user is able to remove the battery 20 from the battery receiving recess 40 without requiring to exert much effort.

When placing the battery 20 in the battery receiving recess 40, there is no need to have the lower surface of the cover protrusion 108 and the supporting surface 36 engaged to each other in advance. Therefore, the placing of the battery 20 in the battery receiving recess 40 is facilitated.

The lower surface of the cover protrusion 108 has a downward inclination toward the rear in side view, and the supporting surface 36 has an outwardly convex profile in side view. Therefore, the lower surface of the cover protrusion 108 and the supporting surface 36 supporting the lower surface of the cover protrusion 108 can be formed without any difficulty so that the structure of the battery 20 and the battery receiving recess 40 can be simplified.

In the illustrated embodiment, the supporting surface 36 has an outwardly convex profile in side view. Therefore, the user is allowed to lift the battery 20 by using a rotating motion by sliding the lower surface of the cover protrusion 108 over the supporting surface 36 so that the lifting of the battery 20 is facilitated.

The upper end of the latch member 66 provided in the rear wall of the battery receiving recess 40 moves rearward under the pressure from the battery removal switch 70 so that the engagement between the latch member 66 and the corresponding engagement portion 140 can be readily released. Once the engagement between the latch member 66 and the corresponding engagement portion 140 is released, the battery 20 is urged upward by the first biasing members 80 and the second biasing member 82 so that the battery 20 is raised to a position where the rear end of the battery 20 is not engaged by the latch member 66. Therefore, the user can easily take hold of the grip 104 so that the removable and installing the battery 20 is facilitated.

The upward movement of the battery 20 can be restricted by the engagement between the front engagement portion 50 provided on the front wall that extends downward from the front edge of the battery receiving recess 40 and the front engagement portion 136 provided on the lower front end of the battery 20 so as to engage the front engagement portion 50. Therefore, since the battery 20 is retained in the battery receiving recess 40 once the battery 20 is received in the battery receiving recess 40, even though the battery 20 is upwardly urged by the first biasing members 80 and the second biasing member 82, the front part of the battery 20 is prevented from moving upward out of the battery receiving recess 40.

The battery 20 is urged upward at the front part and at the rear part by the first biasing members 80 and the second biasing member 82, respectively. The front part of the battery 20 is prevented from moving upward by the engagement between the front engagement portion 50 and the front engagement portion 136, and the rear part of the battery 20 is prevented from moving upward by the engagement between the latch member 66 and the corresponding engagement portion 140. Therefore, rattling of the battery 20 can be avoided. Also, the vibrations created during the operation of the electric mower 1 are absorbed by the first biasing members 80 and the second biasing member 82 so that wear of the electric power feeding terminals 132 and the electric power receiving terminals 44, and damage to the battery 20 can be avoided.

Because the second biasing member 82 is provided in the bottom of the front part of the battery receiving recess 40, even when the lower surface of the cover protrusion 108 is dislodged from the supporting surface 36 during the process of removing the battery 20 from the battery receiving recess 40, and the battery 20 is dropped onto the bottom of the battery receiving recess 40, the resulting impact can be absorbed by the second biasing member 82 so that the bottom wall of the battery receiving recess 40 can be protected from damages.

Since the bottom surface of the battery receiving recess 40 is slanted downward toward the front, the battery 20 can be slid along the bottom surface of the battery receiving recess 40 under the gravitational force so that the battery 20 can be installed in the battery receiving recess 40 in an effortless manner.

Since the battery receiving recess 40 is longer in the fore and aft direction than the battery main body 100, the installing of the battery 20 is facilitated. Since the first biasing members 80 are provided between the battery 20 and the rear wall of the battery tray 19 to urge the battery 20 forward, vibrations can be absorbed by the first biasing members 80 so that wear of the electric power feeding terminals 132 and the electric power receiving terminals 44, and damage to the battery 20 can be avoided. Furthermore, since each first biasing member 80 can apply both an upward biasing force and a forward biasing force to the battery 20, the structure can be simplified.

The front end of the battery 20 is still in the battery receiving recess 40 when the rear end of the battery 20 has just been lifted. Therefore, the speed at which the electric power feeding terminals 132 are separated from the electric power receiving terminals 44 is lower in the case where the electric power feeding terminals 132 are provided on the front face of the battery 20 than in the case where the electric power feeding terminals 132 are provided on any other side face of the battery 20 so that the electric power feeding terminals 132 are protected from damages.

Since the electric power receiving terminals 44 are supported in a floating manner, even when the electric power feeding terminals 132 are misaligned from the electric power receiving terminals 44, owing to a sliding movement between the electric power feeding terminals 132 and the electric power receiving terminals 44, the electric power receiving terminals 44 are displaced in such a manner that the electric power feeding terminals 132 are brought into alignment with the electric power receiving terminals 44 so that the battery 20 can be connected to the main body 2 without any difficulty. Thus, a battery mounting structure whereby the connection between the terminals of the main body 2 of the electric mower 1 with the terminals of the battery 20 can be facilitated is provided. Furthermore, owing to the abutting of the electric power receiving terminal guide pieces 46 with the electric power feeding terminal guide pieces 132B, the electric power feeding terminals 132 and the electric power receiving terminals 44 are protected from any direct external force acting thereon so that impairment of the connection between the terminals and damage to the terminals can be avoided.

Since the electric power feeding terminal guide pieces 132B project further than the electric power feeding terminals 132, the electric power feeding terminals 132 are protected from an impact applied from the front, and are therefore protected from damages.

Since the electric power feeding terminal guide pieces 132B are received in the recesses defined on either laterally outer side of the terminal protection pieces 130B, the electric power feeding terminals 132 are favorably protected. Furthermore, as shown in FIGS. 15B and 15C, the lower front end of the battery 20 slides forward over the upper surfaces of the guide rails 60, and the electric power feeding terminals 132 are connected to the electric power receiving terminals 44 from above. The terminal protection pieces 130B of the terminal protection portion 130A are each formed as a plate member having a vertically extending major plane, and the sheet spring portions 132E of the electric power feeding terminals 132 are also formed to be in parallel with the respective major planes. Therefore, the electric power feeding terminals 132 are movable relative to the electric power receiving terminals 44 both in the fore and aft direction and in the lateral direction. Therefore, the battery 20 can be received into the battery receiving recess 40 in a rotational movement.

Since the battery 20 is placed on the guide rails 60 and the battery supporting protrusions 76, the battery 20 does not get immersed in water even when rainwater or the like should get into the battery receiving recess 40 so that the battery 20 is protected from being immersed in water.

Since the electric power feeding terminals 132 and the terminal protection pieces 130B of the terminal protection portion 130A each have major plane extending vertically, moisture can pass through the gaps between the electric power feeding terminals 132 and the terminal protection pieces 130B of the terminal protection portion 130A so that the possibility of the corrosion of the electric power feeding terminals 132 is minimized, and the electric power feeding terminals 132 are favorably protected.

Since the electric power feeding terminal guide pieces 132B are received in the recesses formed on the respective laterally outer sides of the terminal protection portion 130A, the electric power feeding terminal guide pieces 132B are protected from external damages, and the electric power feeding terminals 132 are favorably protected.

Although the present invention has been described in terms of a preferred embodiment thereof, the present invention may be carried out with various alterations and modifications without being limited to the foregoing embodiment.

The lower surface of the cover protrusion 108 has a downward inclination toward the rear in side view in the foregoing embodiment, but the lower surface of the cover protrusion 108 may also have a concave curved shape in side view. In this case also, when raising the rear end part of the battery 20, the user can lift the battery 20 with a rotational movement by allowing the lower surface of the cover protrusion 108 to slide over the supporting surface 36. As a result, the user is enabled to lift the battery 20 with ease since the battery 20 is supported by the battery receiving recess 40 of the main body 2.

The lower surface of the cover protrusion 108 and the supporting surface 36 may have shapes complementary to each other. For instance the curvature of the lower surface of the cover protrusion 108 may have a same curvature as the supporting surface 36 in side view. In this case, the contact area between the lower surface of the cover protrusion 108 and the supporting surface 36 is maximized so that the user can lift the battery 20 in a stable manner.

The user is expected to lift the battery 20 upward immediately after the rear end of the battery 20 has cleared the rear edge of the battery receiving recess 40 in the foregoing embodiment, but the user may also lift the battery 20 upward after the user has rotated the battery 20 with the cover protrusion 108 kept in contact with the supporting surface 36 until the front face of the battery 20 faces substantially downward.

The battery mounting structure is provided on the main body 2 of the electric mower 1 in the foregoing embodiment, but may also be provided on any electric machine such as passenger carrying vehicles.

The main body 2 is provided with seven electric power receiving terminals 44 in the foregoing embodiment, but the number of the electric power receiving terminals 44 is not limited by this example.

The insertion direction of the battery 20 is a forward direction in the foregoing embodiment, but the insertion direction is not limited thereto. For instance, the battery 20 may also be inserted into the battery receiving recess 40 in a rearward, leftward or rightward direction with respect to the main body 2.

Glossary of Terms

1: electric mower (electric power equipment)
2: main body
20: battery
36: supporting surface
40: battery receiving recess
44: electric power receiving terminal
44B: electric power receiving terminal plate
46: electric power receiving terminal guide piece
50: front engagement portion
80: first biasing member (spring member)
82: second biasing member (spring member)
108: cover protrusion
130B: terminal protection piece 132: electric power feeding terminal
132A: electric power feeding terminal plate
132B: electric power feeding terminal guide piece
136: front engagement portion

The invention claimed is:

1. Electric power equipment, comprising:
a main body defining a battery receiving recess having an open upper end; and
a battery configured to be received in the battery receiving recess;
an electric power feeding terminal provided on a side of the battery; and
an electric power receiving terminal provided on a side of the battery receiving recess,
wherein an upper part of an end part of the battery on a first side is provided with a projection projecting in a direction of the first side, and an end part of the battery on a second side is provided with a grip,
wherein an upper edge of an end part of the battery receiving recess on the first side is provided with a supporting surface configured to support a lower surface of the projection at least when the battery is being removed from the battery receiving recess,
wherein the electric power feeding terminal is provided on a side face of the end part of the battery on the first side, and the electric power receiving terminal is provided adjacent to the upper edge of the battery receiving recess,
wherein the battery is configured to be inserted into the battery receiving recess in a prescribed insertion direction, and a front end of the battery with respect to the insertion direction is provided with an electric power feeding terminal plate, the electric power feeding terminal including a plurality of electric power feeding terminals projecting from the electric power feeding terminal plate and arranged along a lateral direction which is orthogonal to the insertion direction and horizontal, and
wherein the electric power feeding terminal plate is provided with a pair of electric power feeding terminal guide pieces projecting further than the electric power feeding terminals from parts of the electric power feeding terminal plate located on laterally outer sides of the respective laterally outermost electric power feeding terminals, wherein an electric power receiving terminal plate is supported by a front end part of the battery receiving recess with respect to the prescribed insertion direction, and the electric power receiving terminal includes a plurality of electric power receiving terminals projecting from the electric power receiving terminal plate so as to correspond to the respective electric power feeding terminals,
wherein the electric power receiving terminal plate is provided with a pair of electric power receiving terminal guide pieces projecting from parts of the electric power receiving terminal plate located on laterally outer sides of respective laterally outermost electric power receiving terminals,
wherein the electric power receiving terminal plate is movable in the lateral direction with respect to the main body so that both the electric power receiving terminals and the electric power receiving terminal guide pieces are movable relative to the main body while the relative positional relationship between the electric power receiving terminals and the electric power receiving terminal guide pieces are maintained, and
wherein one of the electric power receiving terminal guide piece pair and the electric power feeding terminal guide piece pair are provided with a pair of guide surfaces laterally facing outwardly and configured to come closer to each other toward projecting ends thereof while another of the electric power receiving terminal guide piece pair and the electric power feeding terminal guide piece pair are provided with a pair of corresponding guide surfaces laterally facing inward and progressively spaced apart from each other toward projecting ends thereof.

2. The electric power equipment according to claim 1, wherein the lower surface of the projection is provided with a downward inclination toward the second side in side view, and the supporting surface is provided with a convex outer profile in side view.

3. The electric power equipment according to claim 2, wherein the lower surface of the projection is provided with a concave curved profile in side view.

4. The electric power equipment according to claim 2, wherein the supporting surface is provided with a convex curved outer profile in side view.

5. The electric power equipment according to claim 2, wherein the lower surface of the projection and the supporting surface are provided with mutually complementary profiles.

6. The electric power equipment according to claim 1, further comprising:
a spring member provided in an end part of a bottom part of the battery receiving recess on the second side and configured to urge the battery received in the battery receiving recess upward; and
a latch member provided in an end wall part of the battery receiving recess on the second side and configured to engage the end part of the battery on the second side.

7. The electric power equipment according to claim 1, further comprising:
an engagement portion provided in a wall continuously extending downward from the upper edge of the end part of the battery receiving recess on the first side; and
a corresponding engagement portion provided in a lower part of the battery on the first side and configured to be engaged by the engagement portion so as to restrict an upward movement of the battery.

8. The electric power equipment according to claim 1, further comprising a spring member provided in a bottom part of the end part of the battery receiving recess on the first side and configured to urge the battery received in the battery receiving recess upward.

9. The electric power equipment according to claim 1, wherein a bottom surface of the battery receiving recess is provided with a downward inclination toward the first side.

10. The electric power equipment according to claim 1, further comprising a plurality of terminal protection pieces provided between adjoining electric power feeding terminals and on the outer side of each laterally outermost electric power feeding terminal, each terminal protection piece being formed as a plate member having a vertically extending major plane and projecting forward from the battery in the prescribed insertion direction,
wherein each electric power receiving terminal is formed as a plate member having a vertically extending major plane, and each electric power feeding terminal includes a pair of sheet spring pieces configured to contact two sides of a corresponding electric power receiving terminal.

11. The electric power equipment according to claim 10, wherein a side part of at least one of the terminal protection pieces is provided with a recess extending in the prescribed insertion direction, and a part of a corresponding electric power feeding terminal is configured to be received in the recess.

12. The electric power equipment according to claim 11, wherein a laterally outward facing side part of each of the terminal protection pieces provided on either lateral end is provided with a recess extending in a direction of projection of each terminal protection piece to receive a corresponding electric power feeding terminal guide piece.

\* \* \* \* \*